United States Patent
Kim et al.

(10) Patent No.: US 11,546,121 B2
(45) Date of Patent: Jan. 3, 2023

(54) OPERATION METHOD OF TERMINAL AND BASE STATION IN WIRELESS COMMUNICATION SYSTEM SUPPORTING UNLICENSED BAND AND DEVICE FOR SUPPORTING SAME

(71) Applicant: LG ELECTRONICS INC., Seoul (KR)

(72) Inventors: Seonwook Kim, Seoul (KR); Suckchel Yang, Seoul (KR); Changhwan Park, Seoul (KR); Duckhyun Bae, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 17/044,306

(22) PCT Filed: Apr. 5, 2019

(86) PCT No.: PCT/KR2019/004044
§ 371 (c)(1),
(2) Date: Sep. 30, 2020

(87) PCT Pub. No.: WO2019/194624
PCT Pub. Date: Oct. 10, 2019

(65) Prior Publication Data
US 2021/0367743 A1 Nov. 25, 2021

(30) Foreign Application Priority Data

Apr. 5, 2018 (KR) .................. 10-2018-0039919
Sep. 21, 2018 (KR) .................. 10-2018-0114485
Jan. 10, 2019 (KR) .................. 10-2019-0003566

(51) Int. Cl.
*H04L 5/00* (2006.01)
*H04W 74/08* (2009.01)

(52) U.S. Cl.
CPC ....... *H04L 5/0078* (2013.01); *H04W 74/0808* (2013.01)

(58) Field of Classification Search
CPC ... H04L 5/0078; H04L 5/0044; H04L 5/0053; H04L 5/0098; H04L 27/0006;
(Continued)

(56) References Cited

U.S. PATENT DOCUMENTS

2018/0295651 A1* 10/2018 Cao .................. H04W 72/14
2019/0174466 A1* 6/2019 Zhang ................ H04L 5/005
2020/0195331 A1* 6/2020 Chen .................. H04B 7/0456

FOREIGN PATENT DOCUMENTS

WO   2016036081   3/2016

OTHER PUBLICATIONS

PCT International Application No. PCT/KR2019/004044, International Search Report dated Jul. 11, 2019, 16 pages.
(Continued)

*Primary Examiner* — Pao Sinkantarakorn
*Assistant Examiner* — Kabir U Jahangir
(74) *Attorney, Agent, or Firm* — Lee Hong Degerman Kang Waimey

(57) ABSTRACT

The present invention discloses an operation method of a terminal and a base station in a wireless communication system supporting an unlicensed band and a device for supporting same. The present invention discloses an operation method of a terminal and a base station and a device for supporting same, according to one specific embodiment, wherein the method is based on signaling, to the terminal, whether or not the base station is occupied by each channel access procedure (CAP) subband through downlink control information (DCI) including slot format information for one or more slots.

13 Claims, 19 Drawing Sheets

(58) Field of Classification Search
CPC .......... H04W 74/0808; H04W 72/042; H04W 72/0453; H04W 76/28
See application file for complete search history.

(56) References Cited

OTHER PUBLICATIONS

Vivo, "Potential Solutions and techniques for NR unlicensed spectrum," 3GPP TSG RAN WG1 Meeting #92, R1-1801557, Mar. 2018, 8 pages.
Nokia, "On the remaining aspects of group common PDCCH in NR," 3GPP TSG-RAN WG1 RAN1#90bis, R1-1718603, Oct. 2017, 6 pages.
ASUSTeK, "Discussion on GC PDCCH," 3GPP TSG RAN WG1 Meeting #92, R1-1802247, Mar. 2018, 5 pages.
Sony, "NR unlicensed design considerations," 3GPP TSG RAN WG1 Meeting #92, R1-1802066, Mar. 2018, 6 pages.

* cited by examiner

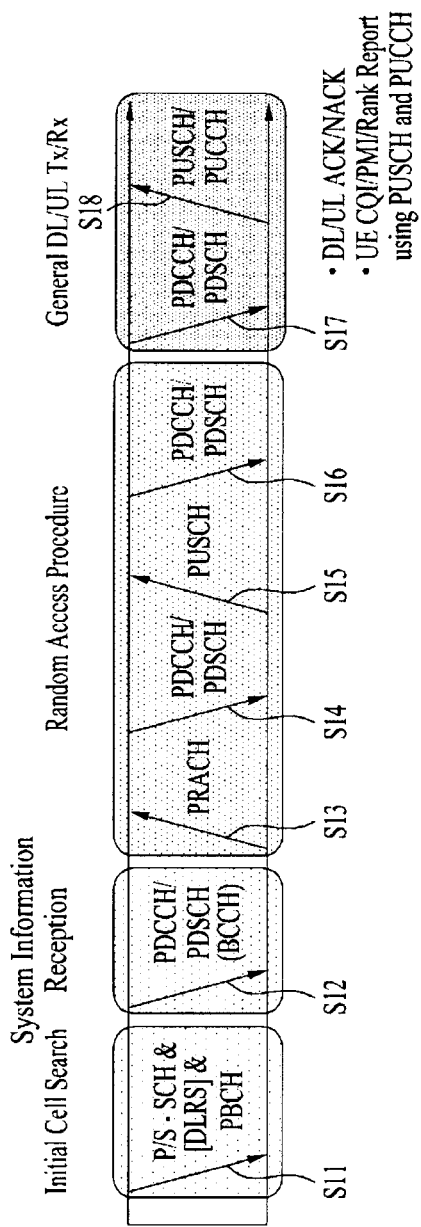
[FIG. 1]

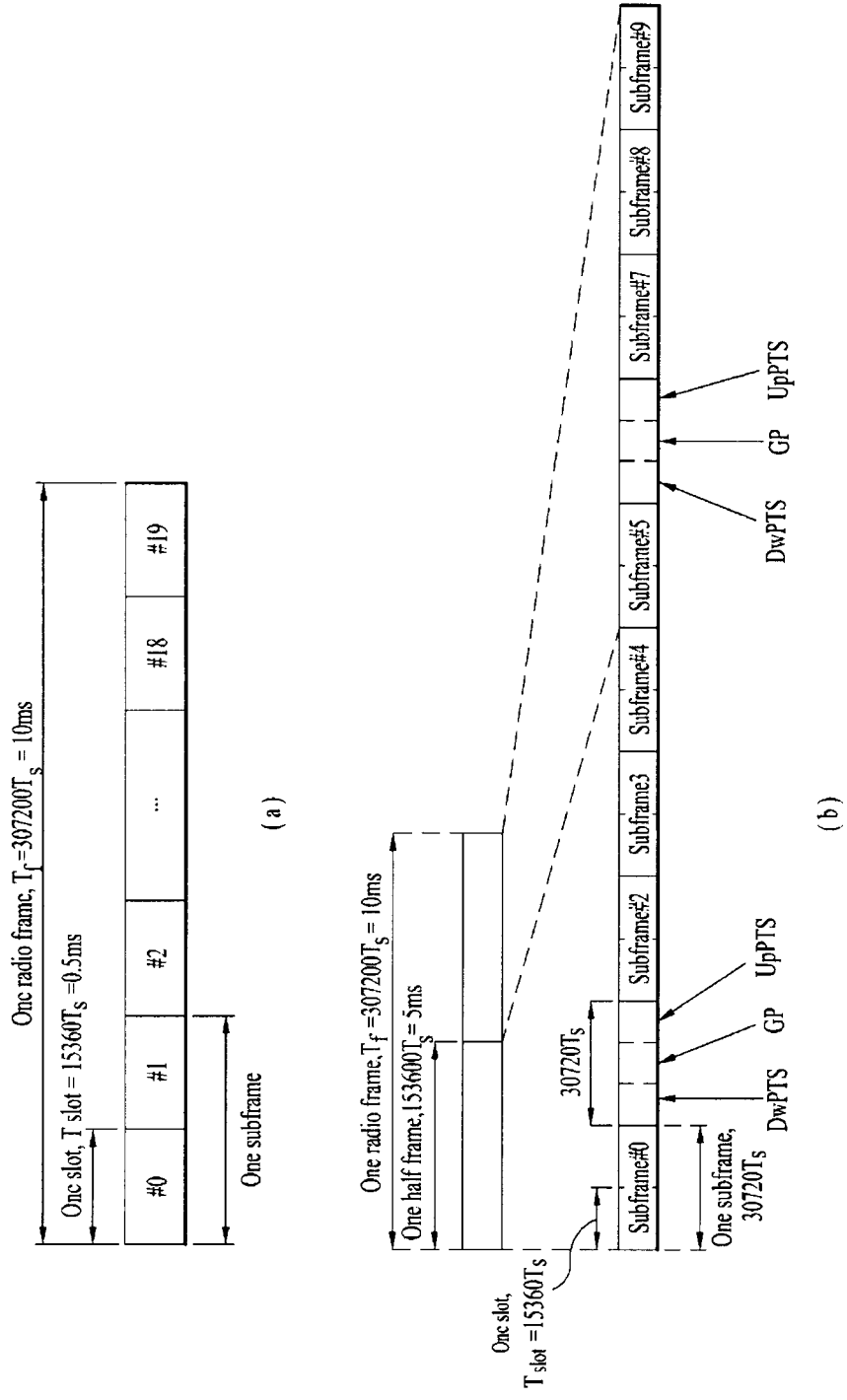

[FIG. 3]
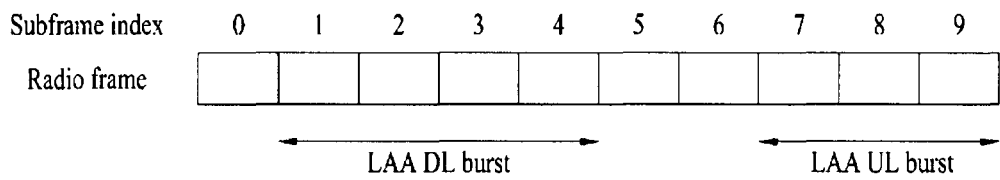
[FIG. 4]
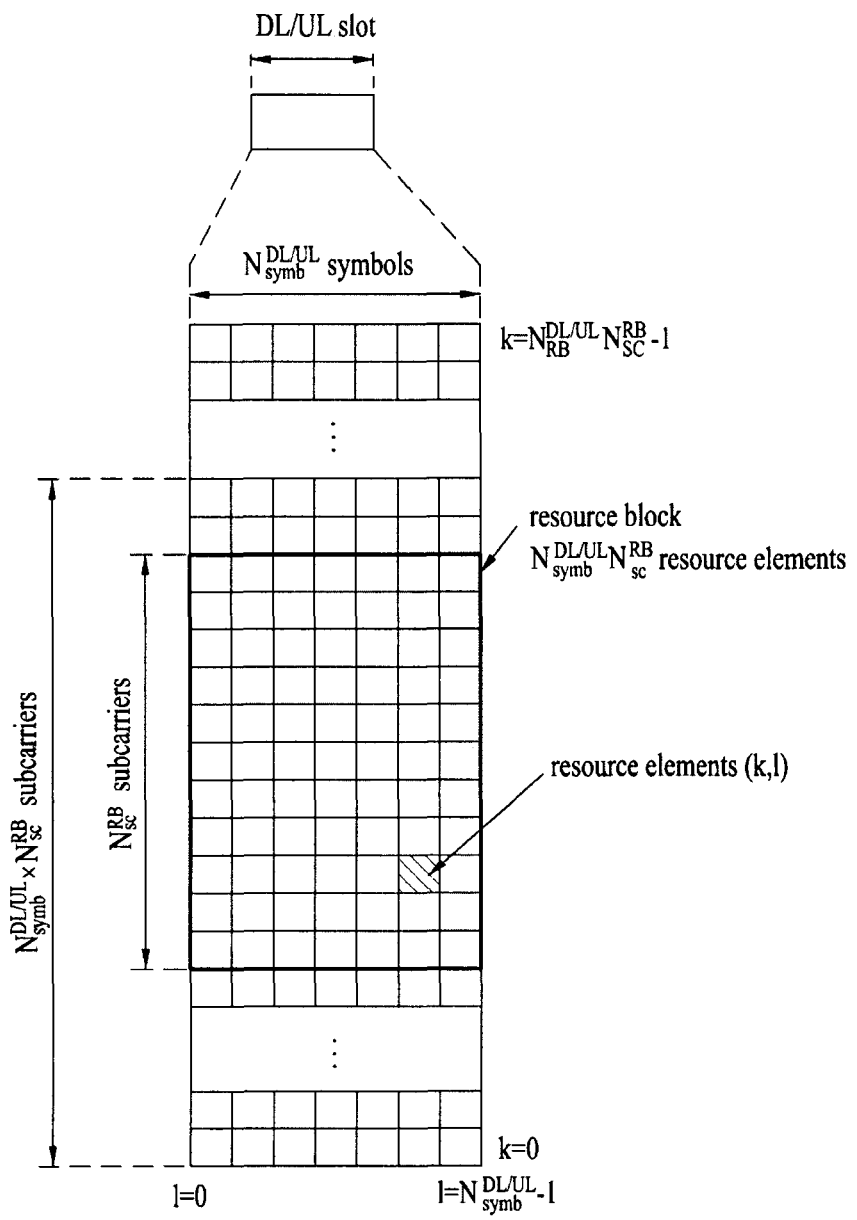

[FIG. 5]
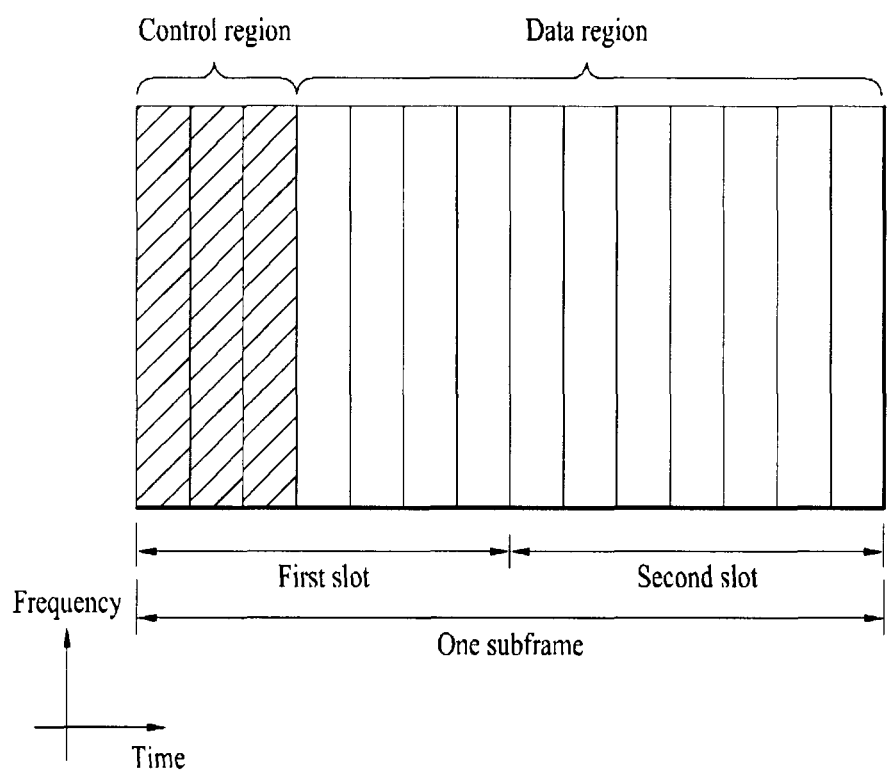

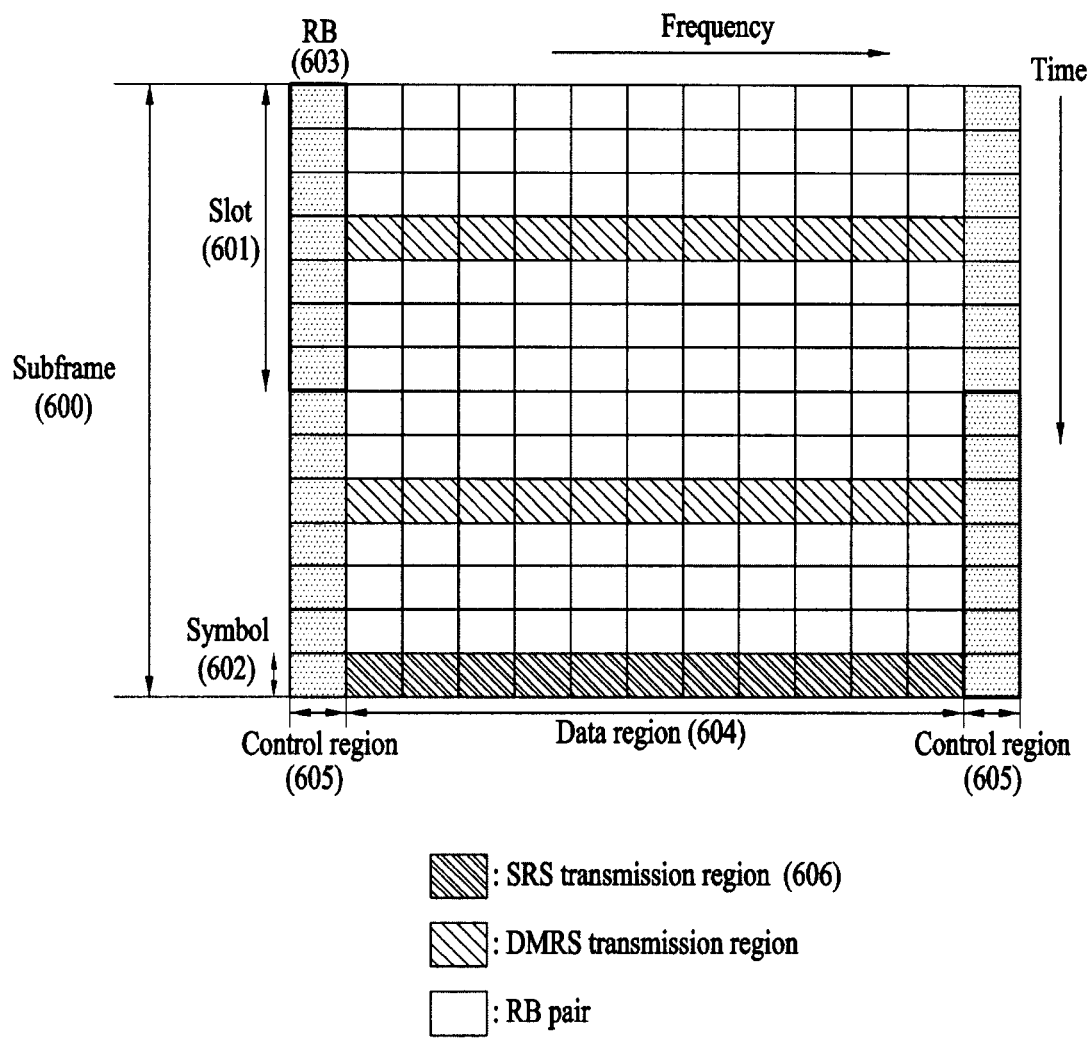

[FIG. 7]
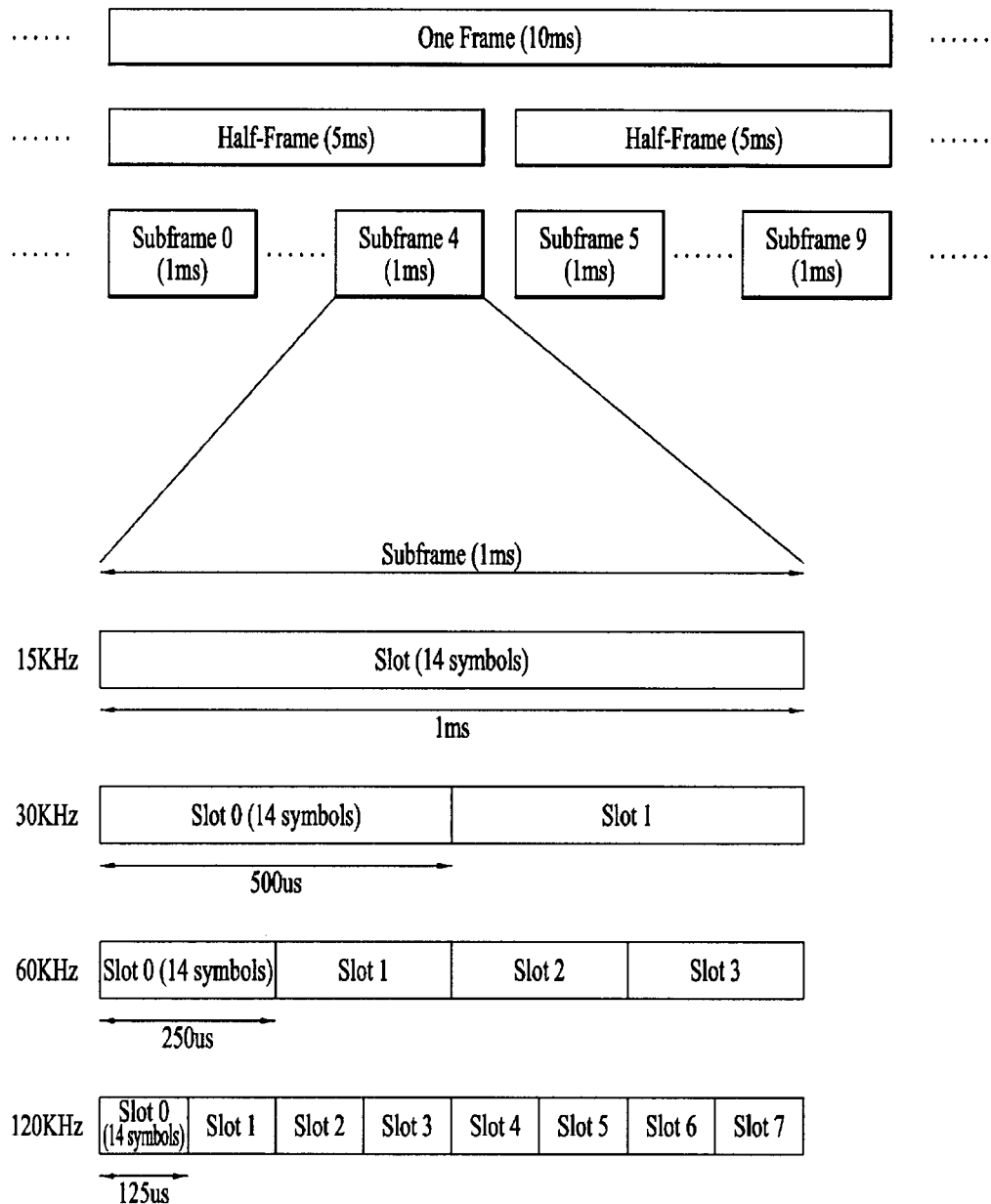

[FIG. 8]
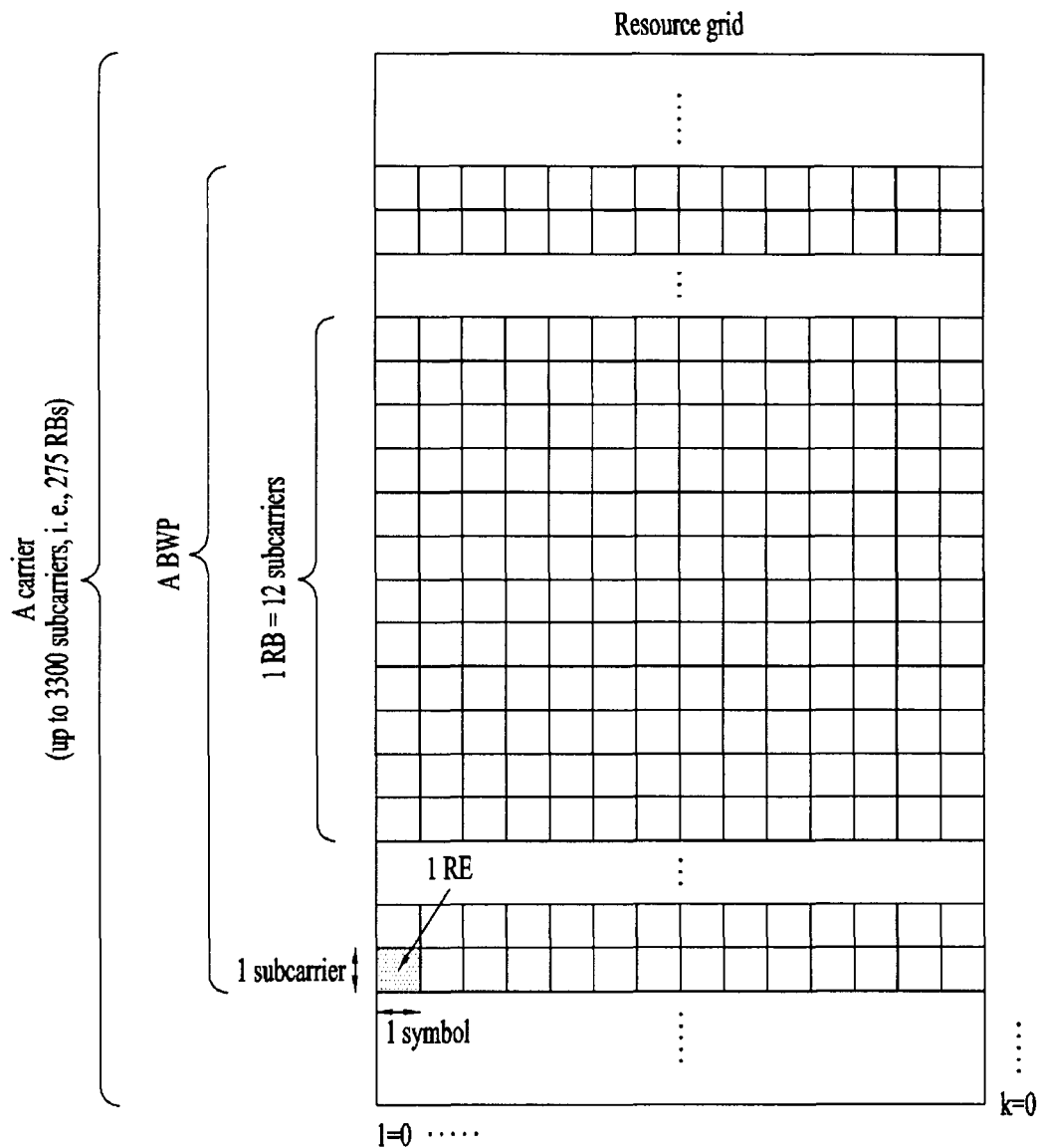

[FIG. 9]
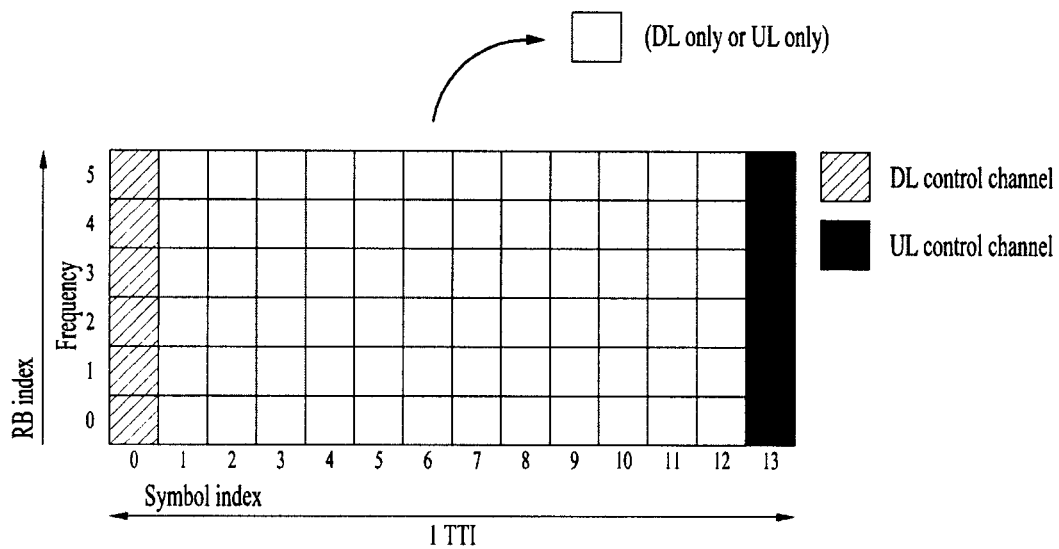
[FIG. 10]
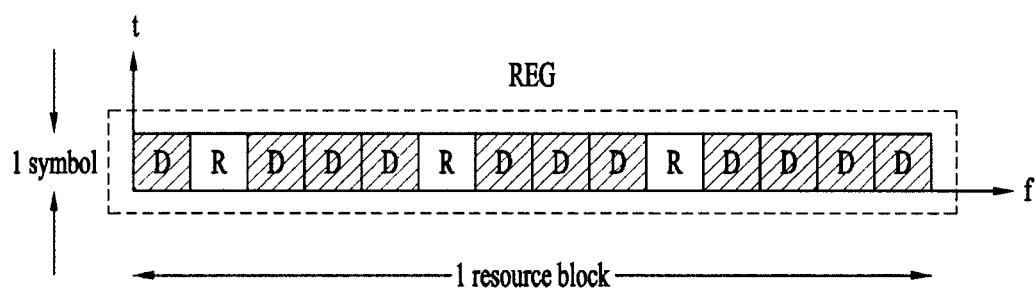

[FIG. 11]
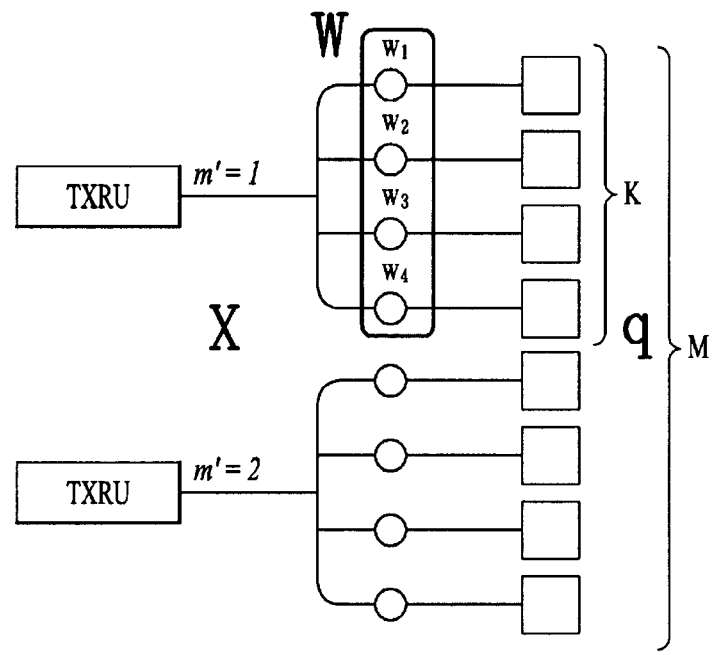
[FIG. 12]
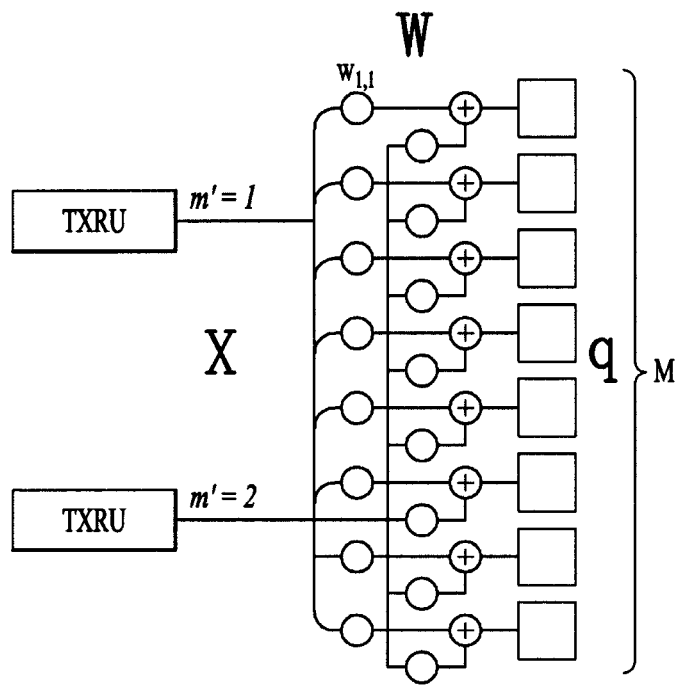

[FIG. 13]
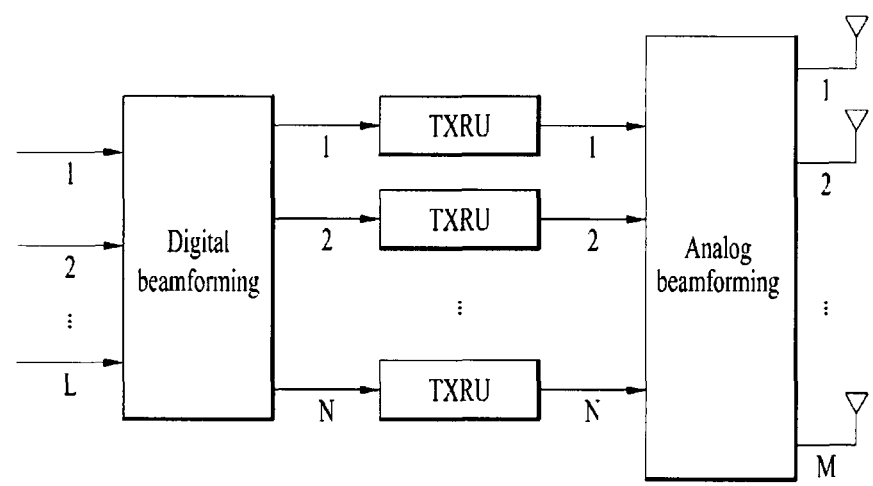

[FIG. 14]
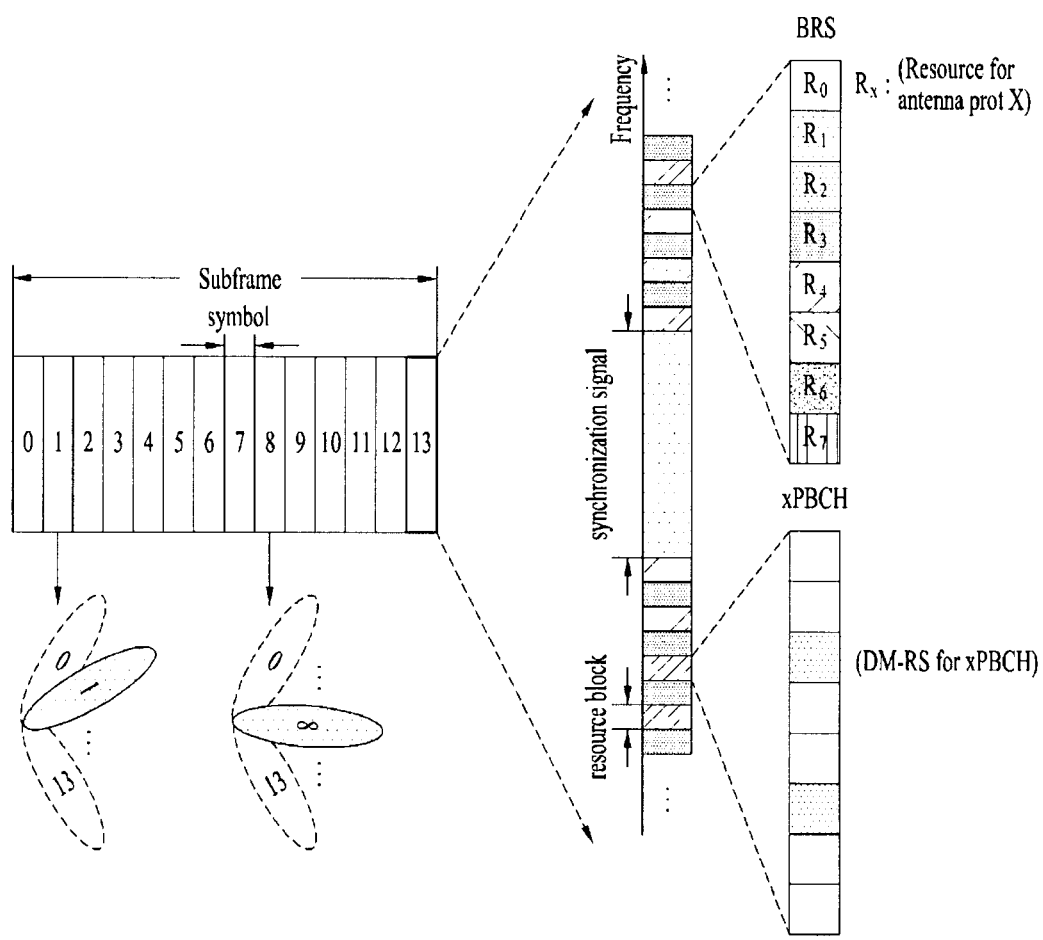

[FIG. 15]
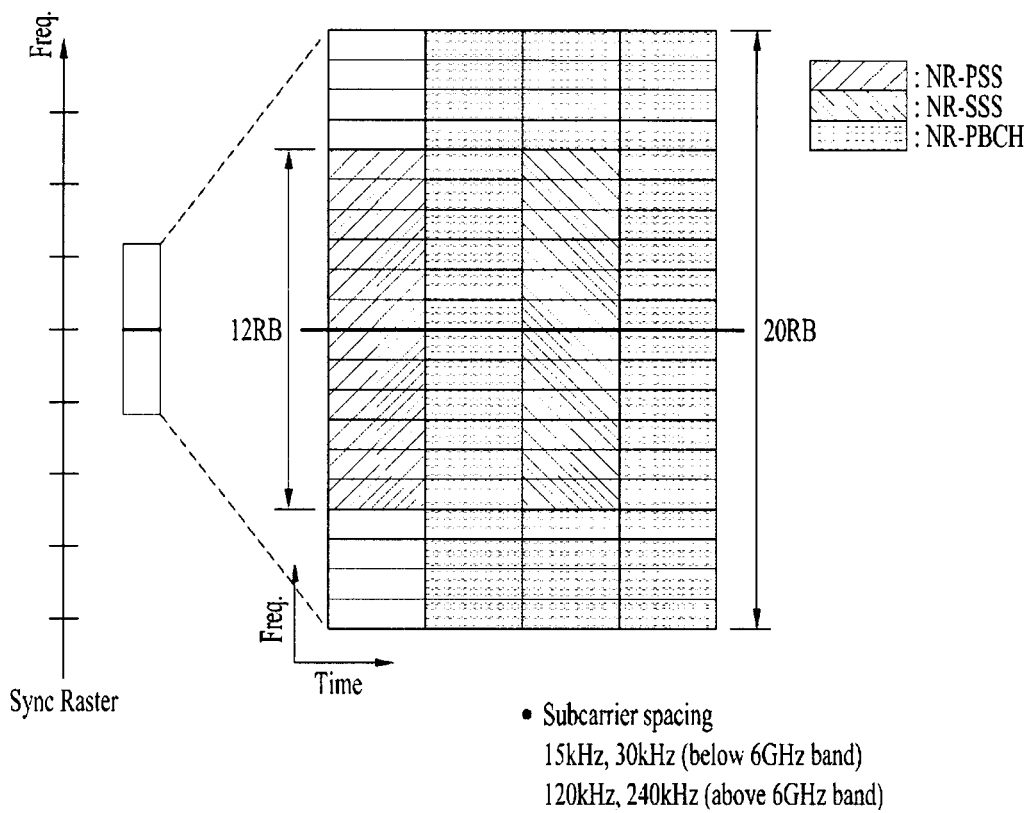
[FIG. 16]
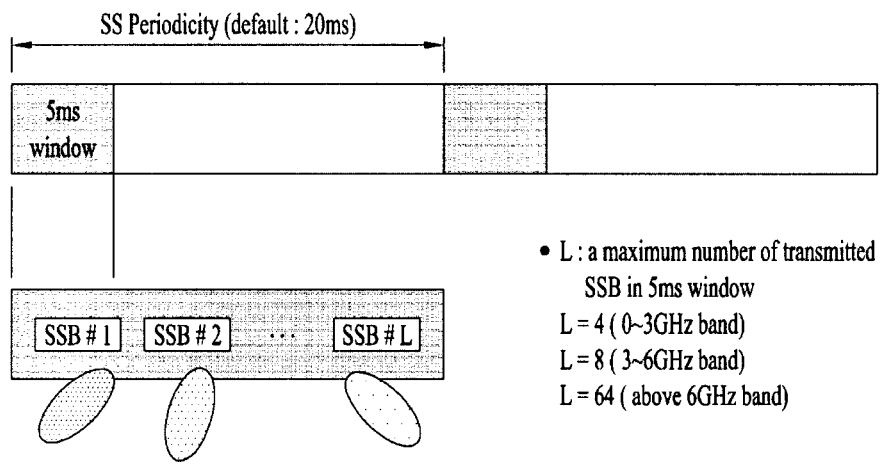

[FIG. 17]
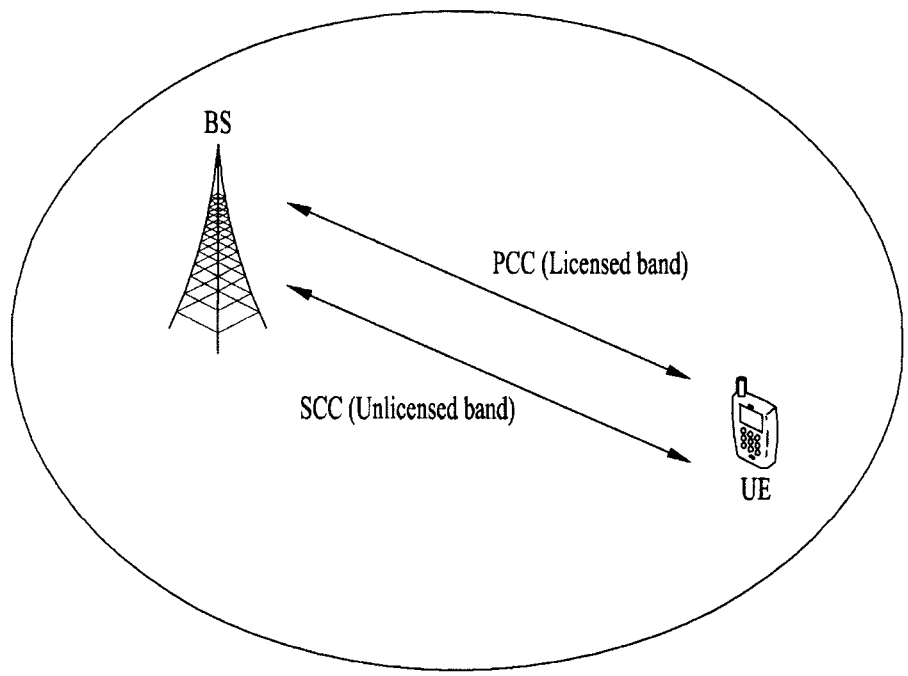
(a) Carrier aggregation between L-band and U-band
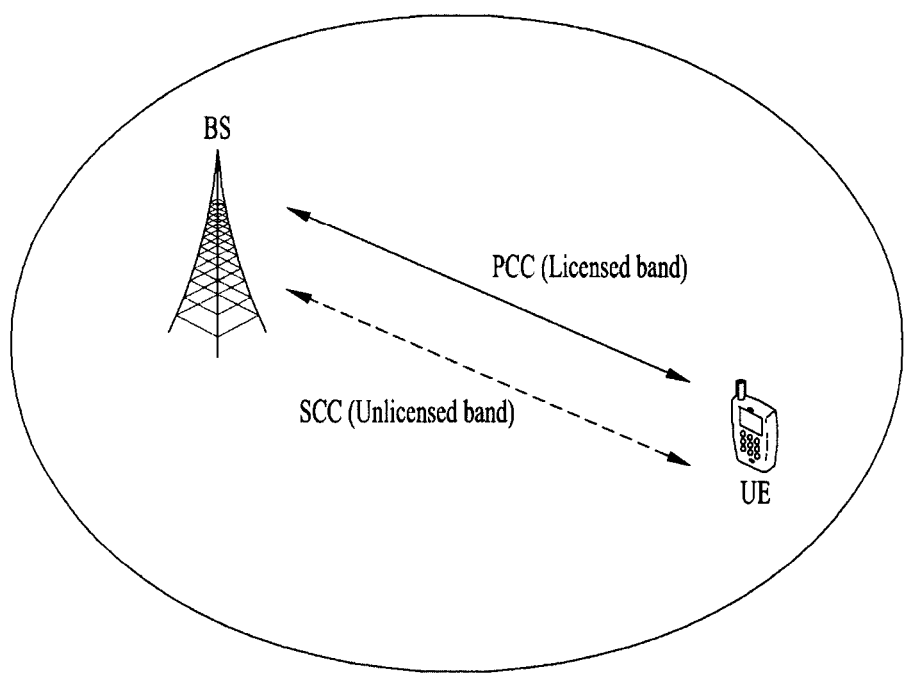
(b) Standalone U-band(s)

[FIG. 18]
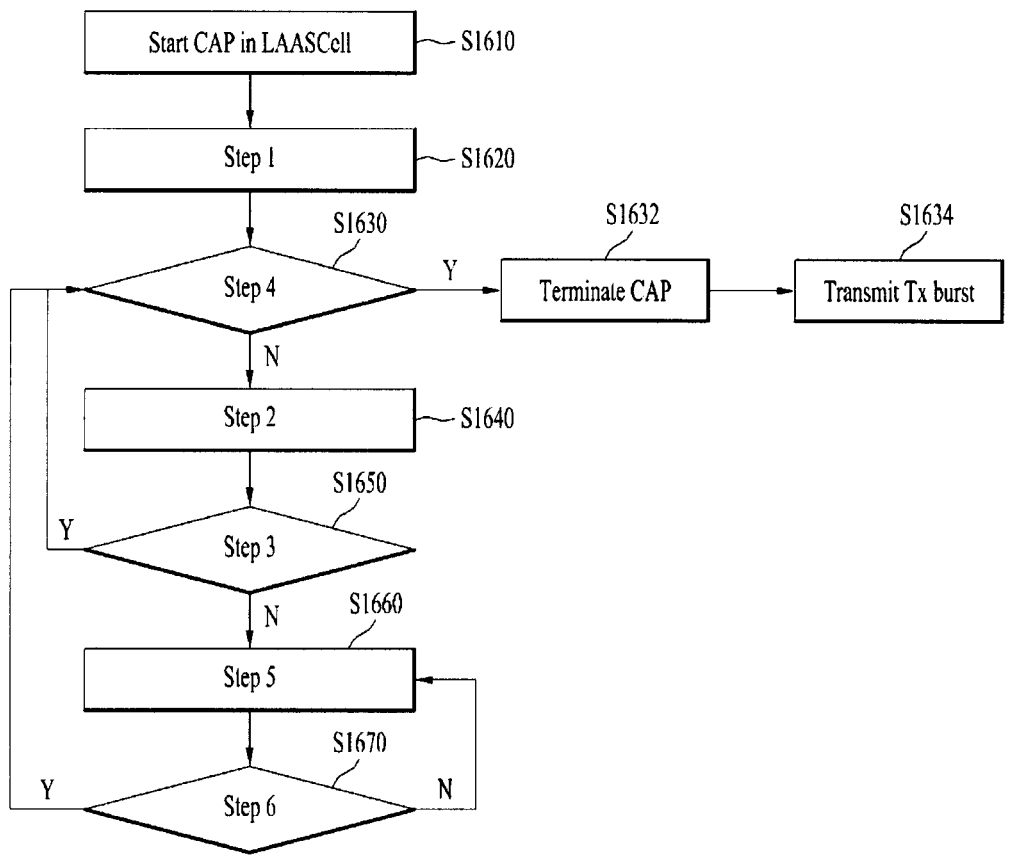
[FIG. 19]
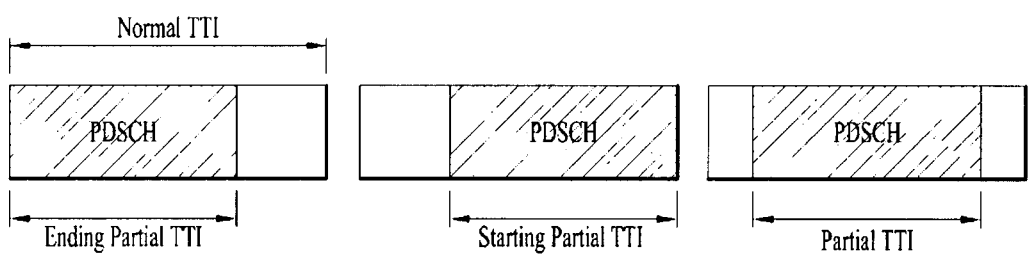

[FIG. 20]
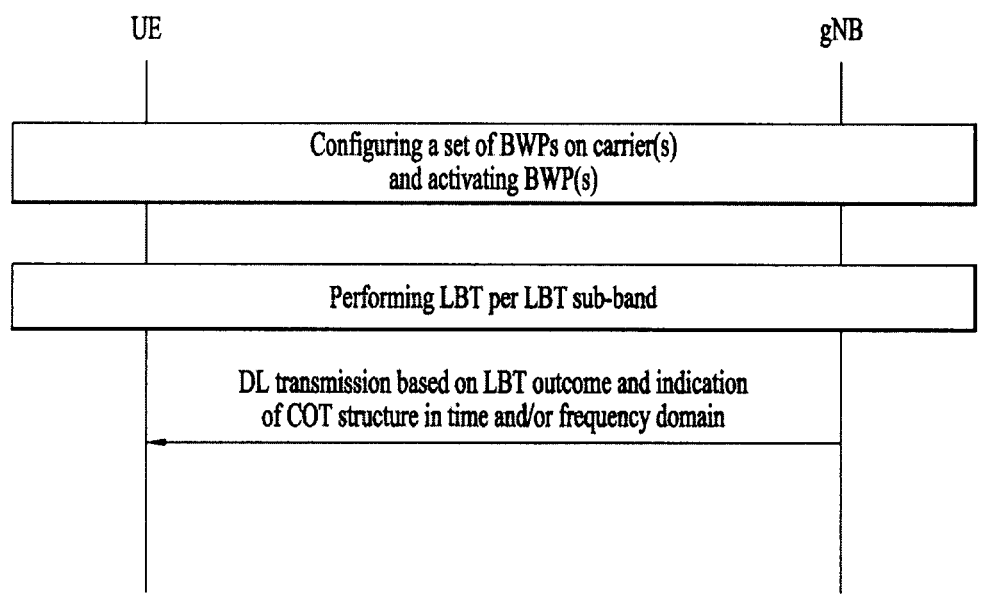

[FIG. 21]
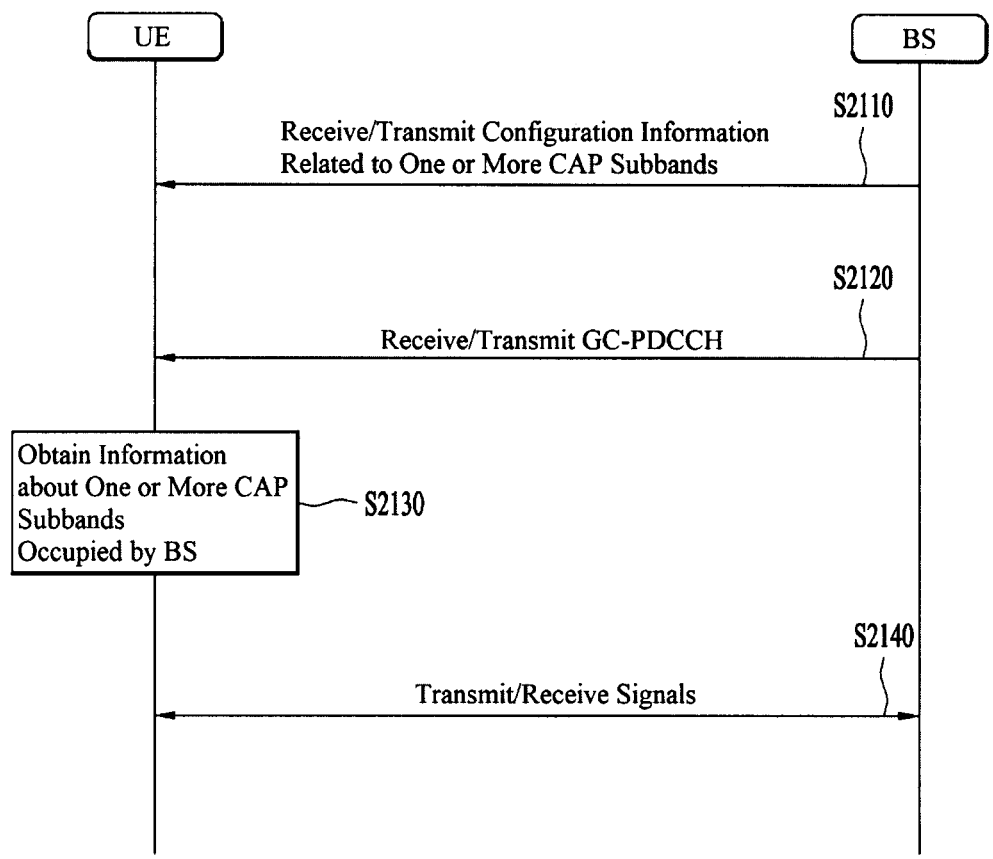

[FIG. 22]
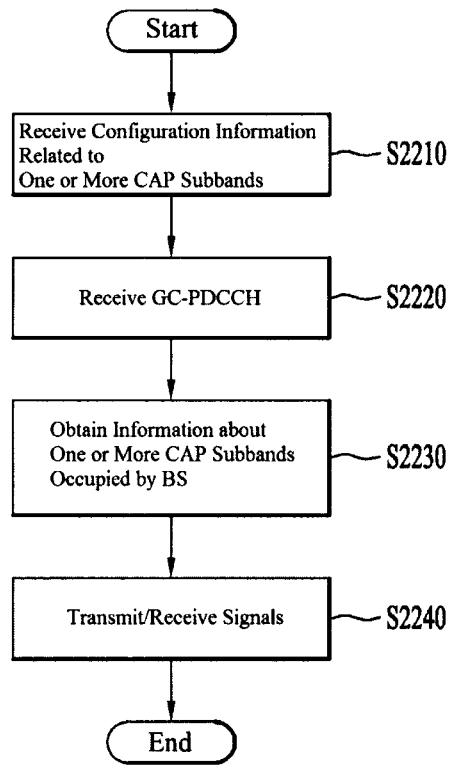
[FIG. 23]
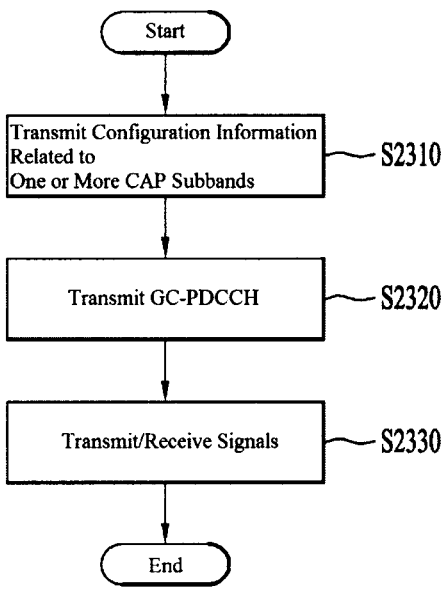

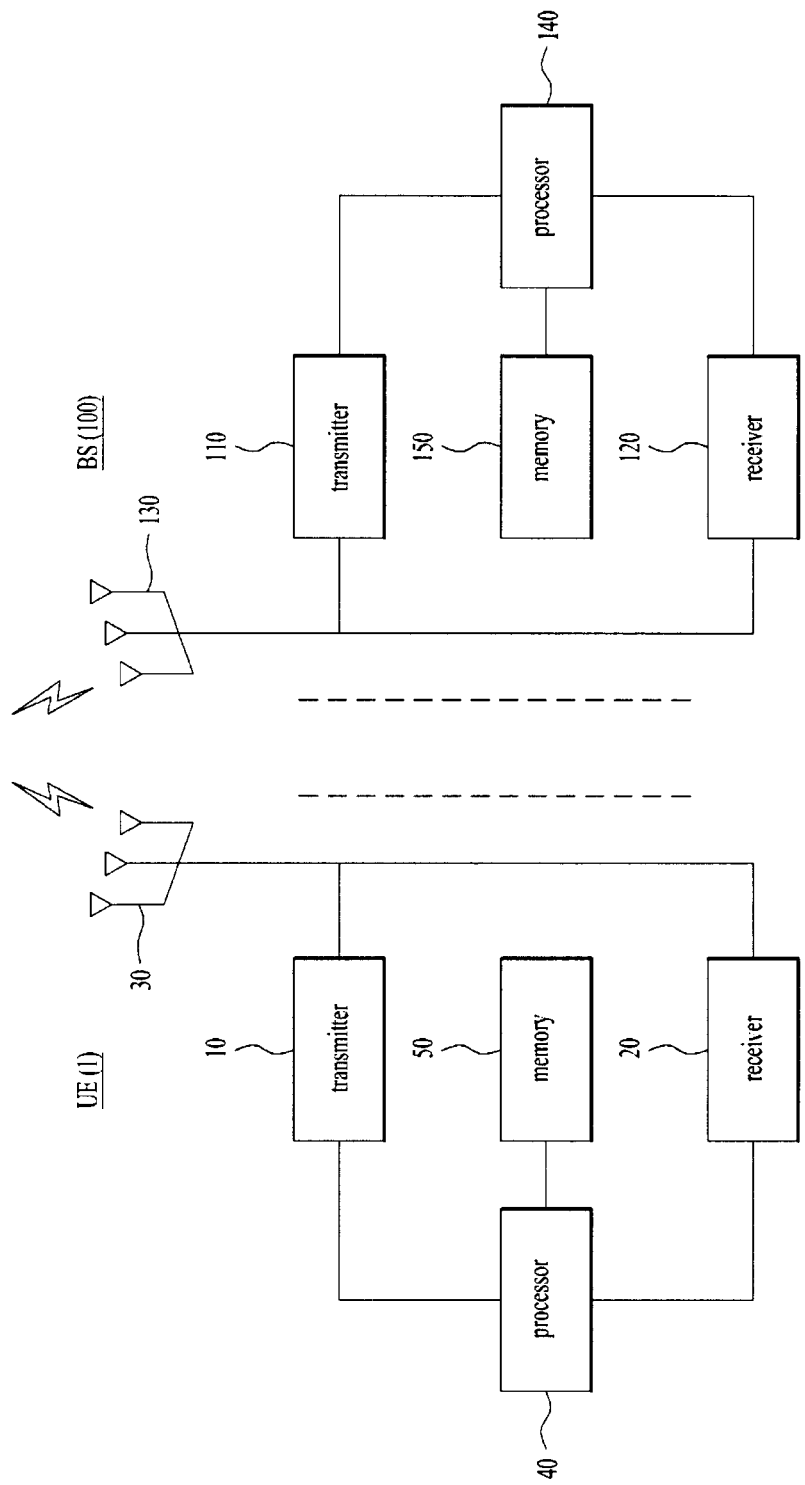
[FIG. 24]

[FIG. 25]
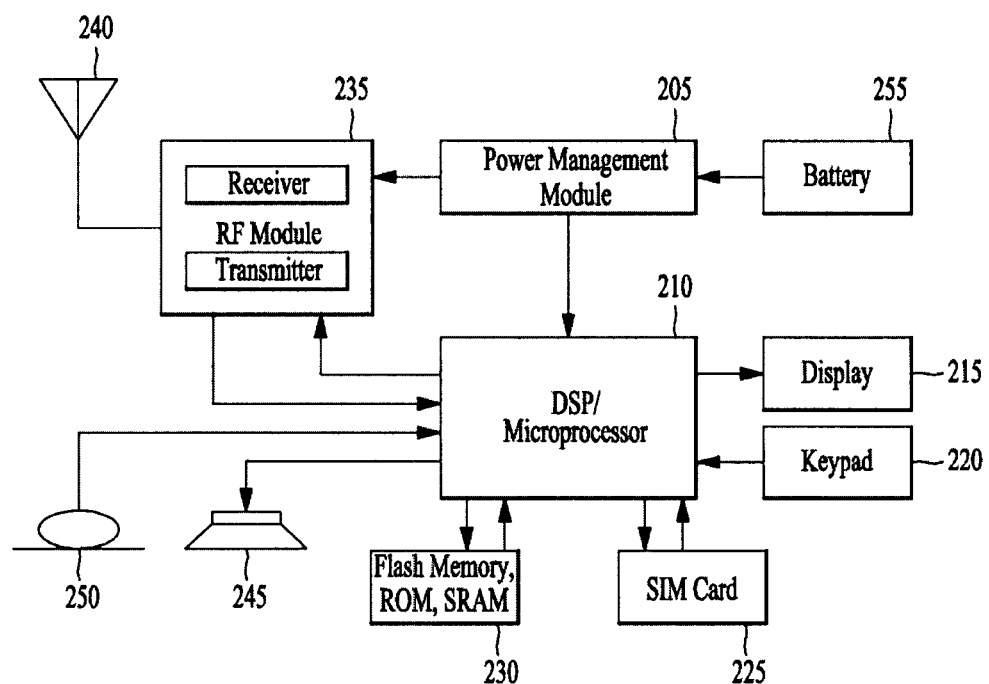

OPERATION METHOD OF TERMINAL AND BASE STATION IN WIRELESS COMMUNICATION SYSTEM SUPPORTING UNLICENSED BAND AND DEVICE FOR SUPPORTING SAME

CROSS-REFERENCE TO RELATED APPLICATIONS

This application is the National Stage filing under 35 U.S.C. 371 of International Application No. PCT/KR2019/004044, filed on Apr. 5, 2019, which claims the benefit of earlier filing date and right of priority to Korean Application Nos. 10-2018-0039919, filed on Apr. 5, 2018, 10-2018-0114485, filed on Sep. 21, 2018, and 10-2019-0003566, filed on Jan. 10, 2019, the contents of which are all hereby incorporated by reference herein in their entirety.

TECHNICAL FIELD

The present disclosure relates to a wireless communication system, and more particularly, to operation methods of a user equipment (UE) and a base station (BS) in a wireless communication system supporting an unlicensed band, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

An aspect of the present disclosure is to provide operation methods of a user equipment (UE) and a base station (BS) in a wireless communication system supporting an unlicensed band, and apparatuses supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides operation methods of a user equipment (UE) and a base station (BS) and apparatuses supporting the same.

In an aspect of the present disclosure, an operation method of a UE in a wireless communication system supporting an unlicensed band includes obtaining configuration information related to one or more first channel access procedure (CAP) subbands included in the unlicensed band, receiving downlink control information (DCI) including slot formation information about one or more slots from a BS, wherein the DCI includes a first field including information indicating, for each CAP subband, whether the CAP subband is occupied by the BS, obtaining information about one or more second CAP subbands occupied by the BS among the one or more first CAP subbands configured for the UE, based on information related to the one or more first CAP subbands configured for the UE in the information included in the first field of the DCI, and transmitting and receiving signals to and from the BS in the unlicensed band, based on the information about the one or more second CAP subbands occupied by the BS among the one or more first CAP subbands configured for the UE.

The information indicating, for each CAP subband, whether the CAP subband is occupied by the BS may correspond to information indicating, for each frequency band of a predetermined size in a frequency domain, whether the frequency band is occupied by the BS.

The information indicating, for each CAP subband, whether the CAP subband is occupied by the BS may correspond to a plurality of pieces of bit information, and the plurality of pieces of bit information may be configured based on an order related to corresponding frequency bands in the frequency domain.

The predetermined size may be 20 MHz.

In the present disclosure, the transmission and reception of signals to and from the BS in the unlicensed band may include receiving a downlink signal in the one or more second CAP subbbands of the unlicensed band from the BS by the UE, based on the information about the one or more second CAP subbands occupied by the BS among the one or more first CAP subbands configured for the UE.

In the present disclosure, the transmission and reception of signals to and from the BS in the unlicensed band may include one or more of transmitting an uplink signal to the BS by the UE during a time period occupied by the BS in the one or second CAP subbands by using a first CAP or transmitting the uplink signal to the BS during a time period not occupied by the BS in the one or second CAP subbands or in a frequency band other than the one or more frequency bands by using a second CAP by the UE, based on the information about the one or more second CAP subbands occupied by the BS among the one or more first CAP subbands configured for the UE. The first CAP may be a CAP for transmitting a signal based on whether a channel is idle during a predetermined time period, and the second CAP may be a CAP related to DCI scheduling the uplink signal.

In the present disclosure, the slot format information about the one or more slots included in the DCI may indicate that each of 14 symbols included in each slot is related to one of a symbol for downlink, a symbol for uplink, and a flexibly used symbol.

In the present disclosure, the DCI may be configured to be transmitted commonly to a plurality of UEs including the UE.

In the present disclosure, the DCI may further include information indicating uplink resources occupied by the BS and uplink resources not occupied by the BS in the one or more second CAP subbands occupied by the BS, distinguishably from each other.

For example, the information indicating uplink resources occupied by the BS and uplink resources not occupied by the BS distinguishably from each other may include, as separate bit information, first information indicating the uplink resources occupied by the BS and second information indicating the uplink resources not occupied by the BS in the one or more second CAP subbands occupied by the BS.

In another example, the information indicating uplink resources occupied by the BS and uplink resources not occupied by the BS distinguishably from each other may include bit information obtained by jointly encoding information indicating the uplink resources occupied by the BS and information indicating the uplink resources not occupied by the BS in the one or more second CAP subbands occupied by the BS.

In the present disclosure, the DCI may further include information about the duration of a time period during which the BS occupies the one or more second CAP subbands.

The information about the duration of a time period during which the BS occupies the one or more second CAP subbands may include information about the duration of a time period during which the BS occupies a second CAP subband, for each of the one or more second CAP subbands.

In the present disclosure, the operation method may further include obtaining configuration information related to a bandwidth part including the one or more first CAP subbands. The obtaining of configuration information related to a bandwidth part may include one or more of obtaining configuration information related to the bandwidth part based on a control resource set (CORESET) for a common search space (SCC) set in a specific type of physical downlink control channel (PDCCH), obtaining configuration information related to an initial bandwidth part by higher-layer signaling, and obtaining configuration information related to one bandwidth part determined by physical-layer signaling among a plurality of bandwidth parts configured by higher-layer signaling.

In the present disclosure, the DCI may be received in a licensed band or the unlicensed band.

In another aspect of the present disclosure, an operation method of a BS in a wireless communication system supporting an unlicensed band includes transmitting, to each of one or more UEs, configuration information related to one or more first CAP subbands included in the unlicensed band, transmitting DCI including slot format information about one or more slots to the one or more UEs, wherein the DCI includes a first field including information indicating, for each CAP subband, whether the CAP subband is occupied by the BS, and transmitting and receiving signals to and from the one or more UEs in the unlicensed band, based on the information indicating, for each CAP subband, whether the CAP subband is occupied by the BS.

In another aspect of the present disclosure, a UE operating in a wireless communication system supporting an unlicensed band includes at least one radio frequency (RF) module, at least one processor, and at least one memory operatively coupled to the at least one processor and storing instructions which when executed, cause the at least one processor to perform an operation. The operation includes obtaining configuration information related to one or more first CAP subbands included in the unlicensed band, receiving DCI including slot formation information about one or more slots from a BS by controlling the at least one RF module, wherein the DCI includes a first field including information indicating, for each CAP subband, whether the CAP subband is occupied by the BS, obtaining information about one or more second CAP subbands occupied by the BS among the one or more first CAP subbands configured for the UE, based on information related to the one or more first CAP subbands configured for the UE in the information included in the first field of the DCI, and transmitting and receiving signals to and from the BS in the unlicensed band by controlling the at least one RF module, based on the information about the one or more second CAP subbands occupied by the BS among the one or more first CAP subbands configured for the UE.

The above aspects of the present disclosure are merely a part of preferred embodiments of the present disclosure, and various embodiments reflecting the technical features of the present disclosure may be derived and understood based on the following detailed description of the present disclosure by those skilled in the art.

Advantageous Effects

As is apparent from the above description, the embodiments of the present disclosure have the following effects.

According to the present disclosure, a base station (BS) may indicate to one or more user equipments (UEs) whether a specific frequency band is occupied by minimal signaling, and the UEs may obtain information about the frequency band occupied by the BS by minimal signaling. Accordingly, signaling overhead may be reduced.

Further, when the total size of a bandwidth part (BWP) configured for a UE is X and the UE identifies that the size of a frequency band occupied by the BS is Y smaller than X, the UE receives/monitors a signal only in the frequency band of the size Y occupied by the BS (even though reception of a downlink signal in the total BWP or in a frequency band larger than the frequency band occupied by the BS has been scheduled by the BS). Therefore, operational complexity may be minimized.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, illustrate the embodiments of the present disclosure together with detail explanation. However, the technical features of the present disclosure are not limited to a specific drawing. The features disclosed in each of the drawings are combined with each other to configure a new embodiment. Reference numerals in each drawing correspond to structural elements.

FIG. 1 is a diagram illustrating physical channels and a signal transmission method using the physical channels.

FIGS. 2 and 3 are diagrams illustrating radio frame structures in a long term evolution (LTE) system to which the embodiments of the present disclosure are applicable.

FIG. 4 is a diagram illustrating a slot structure in the LTE system to which the embodiments of the present disclosure are applicable.

FIG. 5 is a diagram illustrating a downlink subframe structure in the LTE system to which the embodiments of the present disclosure are applicable.

FIG. 6 is a diagram illustrating an uplink subframe structure in the LTE system to which the embodiments of the present disclosure are applicable.

FIG. 7 is a diagram illustrating a radio frame structure in a new radio access technology (NR) system to which the embodiments of the present disclosure are applicable.

FIG. 8 is a diagram illustrating a slot structure in the NR system to which the embodiments of the present disclosure are applicable.

FIG. 9 is a diagram illustrating a self-contained slot structure in the NR system to which the embodiments of the present disclosure are applicable.

FIG. 10 is a diagram illustrating a resource element group (REG) structure in the NR system to which the embodiments of the present disclosure are applicable.

FIGS. 11 and 12 are diagrams illustrating representative methods of connecting transceiver units (TXRUs) to antenna elements.

FIG. 13 is a schematic diagram illustrating a hybrid beamforming structure from the perspective of TXRUs and physical antennas according to an example of the present disclosure.

FIG. 14 is a schematic diagram illustrating a beam sweeping operation for a synchronization signal and system information in a downlink transmission procedure according to an example of the present disclosure.

FIG. 15 is a schematic diagram illustrating a synchronization signal/physical broadcast channel (SS/PBCH) block applicable to the present disclosure.

FIG. 16 is a schematic diagram illustrating an SS/PBCH block transmission configuration applicable to the present disclosure.

FIG. 17 illustrates an exemplary wireless communication system supporting an unlicensed band, which is applicable to the present disclosure.

FIG. 18 is a diagram illustrating a channel access procedure (CAP) for transmission in an unlicensed band, which is applicable to the present disclosure.

FIG. 19 is a diagram illustrating a partial transmission time interval (TTI) or a partial subframe/slot, which is applicable to the present disclosure.

FIG. 20 is a diagram schematically illustrating beam sweeping operation applicable to the present disclosure.

FIG. 21 is a diagram schematically illustrating the operations of a base station (BS) and a user equipment (UE) according to an embodiment of the present disclosure, FIG. 22 is a flowchart illustrating the operation of the BS according to an embodiment of the present disclosure, and FIG. 23 is a flowchart illustrating the operation of the UE according to an embodiment of the present disclosure.

FIG. 24 is a block diagram illustrating the configurations of a UE and a BS for implementing the proposed embodiments.

FIG. 25 is a block diagram illustrating a communication device for implementing the proposed embodiments.

BEST MODE

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. 3GPP LTE/LTE-A System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

FIGS. 2 and 3 are diagrams illustrating radio frame structures in an LTE system to which the embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0-9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |

TABLE 1-continued

| Subslot number | 0 | 1 | 2 | 3 | 4 | 5 |
|---|---|---|---|---|---|---|
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/UL}_{RB} N^{RB}_{sc}$ subcarriers and $N^{DL/UL}_{symb}$ symbols. $N^{DL}_{RB}$ denotes the number of RBs in a DL slot, and $N^{UL}_{RB}$ denotes the number of RBs in a UL slot. $N^{DL}_{RB}$ and $N^{UL}_{RB}$ are dependent on a DL bandwidth and a UL bandwidth, respectively. $N^{DL}_{symb}$ denotes the number of symbols in the DL slot, and $N^{UL}_{symb}$ denotes the number of symbols in the UL slot. $N^{RB}_{sc}$ denotes the number of subcarriers in one RB. The number of symbols in a slot may vary depending on SCSs and CP lengths (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot, where k is a frequency-domain index ranging from 0 to $N^{DL/UL}_{RB} \times N^{RB}_{sc} - 1$ and l is a time-domain index Ranging from 0 to $N^{DL/UL}_{symb} - 1$.

FIG. 5 illustrates a DL subframe structure in an LTE system to which the embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, carrying information about the number of OFDM symbols (i.e., the size of a control region) used for transmission of control channels in the subframe. The PHICH is a response channel for a UL transmission, carrying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (TX) power control command for any UE group.

FIG. 6 is a diagram illustrating a UL subframe structure in an LTE system to which the embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a data region 604 and a control region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

FIG. 7 is a diagram illustrating a radio frame structure in an NR system to which the embodiments of the present disclosure are applicable.

In the NR system, UL and DL transmissions are based on a frame as illustrated in FIG. 7. One radio frame is 10 ms in duration, defined as two 5-ms half-frames. One half-frame is defined as five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

FIG. 8 is a diagram illustrating a slot structure in an NR system to which the embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

FIG. 9 is a diagram illustrating a self-contained slot structures in an NR system to which the embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of regions in one slot may vary in some embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH carries DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

FIG. 10 is a diagram illustrating the structure of one REG in an NR system to which the embodiments of the present disclosure are applicable.

In FIG. 10, D denotes an RE to which DCI is mapped, and R denotes an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

The PUCCH carries UCI, an HARQ-ACK, and/or an SR. Depending on the transmission duration of the PUCCH, the PUCCH is classified into a short PUCCH and a long PUCCH. Table 6 lists exemplary PUCCH formats.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |

TABLE 6-continued

| PUCCH format | Length in OFDM symbols $N_{symb}^{PUCCH}$ | Number of bits | Usage | Etc |
| --- | --- | --- | --- | --- |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (i.e., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to sub-arrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between channel state information reference signal (CSI-RS) antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

FIG. 14 is a diagram schematically illustrating an exemplary beam sweeping operation for a synchronization signal and system information in a DL transmission procedure according to the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one synchronization signal (SS) block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH content-based (e.g., MIB-based) timing detection.

First, the UE may acquire timing synchronization and the physical cell ID of a detected cell by detecting a PSS and an SSS. More specifically, the UE may acquire the symbol timing of the SSB and detect a cell ID within a cell ID group, by PSS detection. Subsequently, the UE detects the cell ID group by SSS detection.

Further, the UE may detect the time index (e.g., slot boundary) of the SSB by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the gNB.

The UE may check whether there is a CORESET for a Type0-PDCCH common search space, based on the MIB.

The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.6. Quasi Co-Located or Quasi Co-Location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay
Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).
Angular spread (AS): When it is said that QCL is guaranteed between antenna ports in terms of AS, this may imply that an AS estimated from one antenna port may be derived/estimated/applied from an AS estimated from another antenna port.
Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

1.7. Bandwidth Part (BWP)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

More specifically, a UE of the present disclosure may perform the following BWP operation.

A UE, which has been configured to operate BWPs of a serving cell, is configured with up to four DL BWPs within the DL bandwidth of the serving cell by a higher-layer parameter (e.g., DL-BWP or BWP-Downlink) and up to four UL BWPs within the UL bandwidth of the serving cell by a higher-layer parameter (e.g., UL-BWP or BWP-Uplink).

When the UE fails to receive a higher-layer parameter initialDownlinkBWP, an initial active DL BWP may be defined by the positions and number of consecutive PRBs: consecutive PRBs from the lowest index to the highest index among PRBs included in a CORESET for a Type-0 PDCCH CSS set. Further, the initial active DL BWP is defined by an SCS and a CP for PDCCH reception in the CORESET for the Type-0 PDCCH CSS set. Alternatively, the initial active DL BWP is provided by the higher-layer parameter initialDownlinkBWP. For an operation in a primary cell or a secondary cell, an initial active UL BWP is indicated to the UE by a higher-layer parameter initialUplinkBWP. When a supplementary UL carrier is configured for the UE, an initial active UL BWP on the supplementary UL carrier may be indicated to the UE by initialUplinkBW in a higher-layer parameter supplementary Uplink.

When the UE has a dedicated BWP configuration, the UE may be provided with a first active DL BWP for reception by a higher-layer parameterfirstActiveDownlinkBWP-Id and a first active UL BWP for transmission on the carrier of the primary cell by a higher-layer parameter firstActiveUplinkGBWP-Id.

For each DL BWP of a DL BWP set or each UL BWP of a UL BWP set, the UE may be provided with the following parameters.

An SCS provided based on a higher-layer parameter (e.g., subcarrierSpacing).

A CP provided based on a higher-layer parameter (e.g., cyclicPrefix).

The number of common RBs and consecutive RBs is provided based on a higher-layer parameter locationAndBandwidth. The higher-layer parameter locationAndBandwidth indicates an offset $RB_{start}$ and a length $L_{RB}$ based on a resource indication value (RIV). It is assumed that $N^{size}_{BWP}$ is 275 and $O_{carrier}$ is provided by offsetToCarrier for the higher-layer parameter subcarrierSpacing.

An index in each set of DL BWPs or each set of UL BWPs, provided based on a higher-layer parameter (e.g., bwp-Id) in UL and DL independently.

A BWP-common set parameter or BWP-dedicated set parameter provided based on a higher-layer parameter (e.g., bwp-Common or bwp-Dedicated).

For an unpaired spectrum operation, a DL BWP in a set of DL BWPs with indexes provided by a higher-layer parameter (e.g., bwp-Id) is linked to a UL BWP in a set of UL BWPs with the same indexes, when the DL BWP index and the UL BWP index are identical. For the unpaired spectrum operation; when the higher-layer parameter bwp-Id of a DL BWP is the same as the higher-layer parameter bwp-Id of a UL BWP, the UE does not expect to receive a configuration in which the center frequency for the DL BWP is different from the center frequency for the UL BWP.

For each DL BWP in a set of DL MVPs of the primary cell (referred to as PCell) or of a PUCCH secondary cell (referred to as PUCCH-SCell), the UE may configure CORESETs for every CSS set and a USS. The UE does not expect to be configured without a CSS on the PCell or the PUCCH-SCell in an active DL MVP When the UE is provided with controlResourceSetZero and searchSpaceZero in a higher-layer parameter PDCCH-ConfigSIB1 or a higher-layer parameter PDCCH-Config-Common, the UE determines a CORESET for a search space set based on controlResourcesetZero and determines corresponding PDCCH monitoring occasions. When the active DL BWP is not the initial DL BWP, the UE determines PDCCH monitoring occasions for the search space set, only if the bandwidth of the CORESET is within the active DL BWP and the active DL BWP has the same SCS configuration and CP as the initial DL BWP.

For each UL BWP in a set of UL BWPs of the PCell or the PUCCH-SCell, the UE is configured with resource sets for PUCCH transmissions.

The UE receives a PDCCH and a PDSCH in a DL BWP according to a configured SCS and CP length for the DL BWP. The UE transmits a PUCCH and a PUSCH in a UL BWP according to a configured SCS and CP length for the UL BWP.

When a bandwidth part indicator field is configured in DCI format 1_1, the value of the bandwidth part indicator field indicates an active DL BWP in the configured DL BWP set, for DL receptions. When a bandwidth part indicator field is configured in DCI format 0_1, the value of the bandwidth part indicator field indicates an active UL BWP in the configured UL BWP set, for UL transmissions.

If a bandwidth part indicator field is configured in DCI format 0_1 or DCI format 1_1 and indicates a UL or DL BWP different from the active UL BWP or DL BWP, respectively, the UE may operate as follows:

For each information field in the received DCI format 0_1 or DCI format 1_1, the following operation is performed.

If the size of the information field is smaller than a size required for interpretation of DCI format 0_1 or DCI format 1_1 for the UL BWP or DL BWP indicated by the bandwidth part indicator, the UE prepends zeros to the information field until its size is the size required for the interpretation of the information field for the UL BWP or DL BWP before the information field of DCI format 0_1 or DCI format 1_1 is interpreted.

If the size of the information field is larger than the size required for interpretation of DCI format 0_1 or DCI format 1_1 for the UL BWP or DL BWP indicated by the bandwidth part indicator, the UE uses as many least significant bits (LSBs) of DCI format 0_1 or DCI format 1_1 as the size required for the UL BWP or DL BWP indicated by the bandwidth part indicator before interpreting the information field of DCI format 0_1 or DCI format 1_1.

The UE sets the active UL BWP or DL BWP to the UL BWP or DL BWP indicated by the bandwidth part indicator in DCI format 0_1 or DCI format 1_1.

The UE does not expect to detect DCI format 1_1 or DCI format 0_1 indicating an active DL BWP or active UL BWP change with a time-domain resource assignment field providing a slot offset value smaller than a delay required for the UE for an active DL BWP change or UL BWP change.

When the UE detects DCI format 1_1 indicating an active DL BWP change for a cell, the UE is not required to receive or transmit a signal in the cell during a time period from the end of the third symbol of a slot in which the UE receives a PDCCH including DCI format 1_1 until the beginning of a slot indicated by the slot offset value of the time-domain resource assignment field in DCI format 1_1.

If the UE detects DCI format 0_1 indicating an active UL BWP change for a cell, the UE is not required to receive or transmit a signal in the cell during a time period from the end of the third symbol of a slot in which the UE receives a PDCCH including DCI format 0_1 until the beginning of a slot indicated by the slot offset value of the time-domain resource assignment field in DCI format 0_1.

The UE does not expect to detect DCI format 1_1 indicating an active DL BWP change or DCI format 0_1 indicating an active UL BWP change in a slot other than the first slot of a set of slots for the SCS of a cell that overlaps with a time period during which the UE is not required to receive or transmit a signal for an active BWP change in a different cell.

The UE expects to detect DCI format 0_1 indicating an active UL BWP change or DCI format 1_1 indicating an active DL BWP change, only if a corresponding PDCCH is received within the first three symbols of a slot.

For the serving cell, the UE may be provided with a higher-layer parameter defaultDownlinkBWP-Id indicating a default DL BWP among the configured DL BWPs. If the UE is not provided with a default DL BWP by defaultDownlinkBWP-Id, the default DL BWP may be set to the initial active DL BWP.

When the UE is provided with a timer value for the PCell by a higher-layer parameter bwp-InactivityTimer and the timer is running, the UE decrements the timer at the end of a subframe for FR1 (below 6 GHz) or at the end of a half subframe for FR2 (above 6 GHz), if a restarting condition is not met during a time period corresponding to the subframe for FR1 or a time period corresponding to the halt-subframe for FR2.

For a cell in which the UE changes an active DL BWP due to expiration of a BWP inactivity timer and for accommodating a delay in the active DL BWP change or the active UL BWP change required by the UE, the UE is not required to receive or transmit a signal in the cell during a time period from the beginning of a subframe for FR1 or a half subframe for FR2, immediately after the BWP inactivity timer expires until the beginning of a slot in which the UE may receive or transmit a signal.

When the BWP inactivity timer of the UE for the specific cell expires within the time period during which the UE is not required to receive or transmit a signal for the active UL/DL BWP change in the cell or in a different cell, the UE may delay the active UL/DL BWP change triggered by expiration of the BWP activity timer until the subframe for FR1 or the half-subframe for FR2 immediately after the UE completes the active UL/DL BWP change in the cell or in the different cell.

When the UE is provided with a first active DL BWP by a higher-layer parameter firstActiveDownlinkBWP-id and a first active UL BWP by a higher-layer parameter firstActiveUplinkBWP-Id on a carrier of the secondary cell, the UE uses the indicated DL BWP and the indicated UL BWP as the respective first active DL BWP and first active UL BWP on the carrier of the secondary cell.

For a paired spectrum operation, when the UE changes an active UL BWP on the PCell during a time period between a detection time of DCI format 1_0 or DCI format 1_1 and a transmission time of a corresponding PUCCH including HARQ-ACK information, the UE does not expect to transmit the PUCCH including the HARQ-ACID information in PUCCH resources indicated by DCI format 1_0 or DCI format 1_1.

When the UE performs radio resource management (RRM) measurement for a bandwidth outside the active DL BWP for the UE, the UE does not expect to monitor a PDCCH.

1.8. Slot Configuration

In the present disclosure, a slot format includes one or more DL symbols, one or more UL symbols, and a flexible symbol. In various embodiments of the present disclosure, the corresponding configurations will be described as DL, UL, and flexible symbol(s), respectively, for the convenience of description.

The following may be applied to each serving cell.

When the UE is provided with a higher-layer parameter TDD-UL-DL-ConfigurationCommon, the UE may configure a slot format per slot over a certain number of slots, indicated by the higher-layer parameter TDD-UL-DL-ConfigurationCommon.

The higher-layer parameter TDD-UL-DL-ConfigurationCommon may provide the following.

A reference SCS configuration $\mu_{ref}$ based on a higher-layer parameter referenceSubcarrierSpacing.

A higher-layer parameter pattern1.

The higher-layer parameter pattern1 may provide the following.

A slot configuration periodicity P msec based on a higher-layer parameter dl-UL-TransmissionPeriodicity.

The number $d_{slots}$ of slots including only DL symbols based on a higher-layer parameter nrofDownlinkSlots.

The number $d_{sym}$ of DL symbols based on a higher-layer parameter nrofDownlinkSymbols.

The number $u_{slots}$ of slots including only UL symbols based on a higher-layer parameter nrofUplinkSlots.

The number $U_{sym}$ of UL symbols based on a higher-layer parameter nrofUplinkSymbols.

For an SCS configuration $\mu_{ref}=3$, only P=0.625 msec may be valid. For an SCS configuration $\mu_{ref}=2$ or $\mu_{ref}=3$, only P=1.25 msec may be valid. For an SCS configuration $\mu_{ref}=1$, $\mu_{ref}=2$ or $\mu_{ref}=3$, only P=2.5 msec may be valid.

The slot configuration periodicity (P msec) includes S slots given by $S=P \cdot 2^{\mu_{ref}}$ in an SCS configuration $\mu_{ref}$. The first $d_{slots}$ slots of the S slots include only DL symbols, and the last $u_{slots}$ slots of the S slots include only UL symbols. $d_{sym}$ symbols following the first $d_{slots}$ slots are DL symbols. $u_{sym}$ symbols preceding the $u_{slots}$ slots are UL symbols. The remaining $(S-d_{slots}-u_{slots}) \cdot N_{symb}^{slot}-d_{sym}-u_{sym}$ symbols are flexible symbols.

The first symbol of every 20/P period is the first symbol of an even-numbered frame.

When the higher-layer parameter TDD-UL-DL-ConfigurationCommon provides higher-layer parameters pattern1 and pattern2, the UE configures a slot format per slot over a first number of slots based on the higher-layer parameter pattern1, and a slot format per slot over a second number of slots based on the higher-layer parameter pattern2.

The higher-layer parameter pattern2 may provide the following.

A slot configuration periodicity $P_2$ msec based on a higher-layer parameter dl-UL-TransmissionPeriodicity.

The number $d_{slots,2}$ of slots including only DL symbols based on a higher-layer parameter nrofDownlinkSlots.

The number $d_{sym,2}$ of DL symbols based on a higher-layer parameter nrofDownlinkSymbols.

The number $u_{slots,2}$ of slots including only UL symbols based on a higher-layer parameter nrofUplinkSlots.

The number $U_{sym,2}$ of UL symbols based on a higher-layer parameter nrofUplinkSymbols.

A $P_2$ value applicable according to an SCS configuration is equal to a P value applicable according to the SCS configuration.

A slot configuration periodicity $P+P2$ msec includes the first S slots where $S=P \cdot 2^{\mu_{ref}}$ and the second $S_2$ slots where $S_2=P_2 \cdot 2^{\mu_{ref}}$.

The first $d_{slots,2}$ ones of the $S_2$ slots include only DL symbols, and the last $u_{slots,2}$ ones of the $S_2$ slots include only UL symbols. $d_{sym,2}$ symbols following the first $d_{slots,2}$ slots are DL symbols. $u_{sym,2}$ symbols preceding the $U_{slots,2}$ slots are UL symbols. The remaining $(S_2-d_{slots,2}-u_{slots,2})\cdot N_{symb}^{slot}-d_{sym,2}-u_{sym,2}$ symbols are flexible symbols.

The UE expects the value of $P+P_2$ to be divided by 20 msec without a remainder. In other words, the UE expects the value of P+P2 to be an integer multiple of 20 msec.

The first symbol of every $20/(P+P_2)$ period is the first symbol of an even-numbered frame.

The UE expects that the reference SCS configuration $\mu_{ref}$ is smaller than or equal to an SCS configuration $\mu$ for any configured DL BWP or UL BWP. Each slot (configuration) provided by the higher-layer parameter pattern1 or pattern2 is applicable to $2^{(\mu-\mu_{ref})}$ consecutive slots in the active DL BWP or active UL BWP in the first slot which starts at the same time as the first slot for the reference SCS configuration $\mu_{ref}$. Each DL, flexible, or UL symbol for the reference SCS configuration $\mu_{ref}$ corresponds to $2^{(\mu-\mu_{ref})}$ consecutive DL, flexible, or UL symbols for the SCS configuration P When the UE is additionally provided with a higher-layer parameter Tdd-UL-DL-ConfigurationDedicated, the higher-layer parameter Tdd-UL-DL-ConfigurationDedicated overrides only flexible symbols per slot over the number of slots as provided by the higher-layer parameter Tdd-UL-DL-ConfigurationCommon.

The higher-layer parameter Tdd-UL-DL-Configuration-Dedicated may provide the following.

A set of slot configurations based on a higher-layer parameter slotSpecificConfigurationsToAddModList.

Each slot configuration in the set of slot configurations.
A slot index based on a higher-layer parameter slotIndex.
A set of symbols based on a higher-layer parameter symbols.
   If the higher-layer parameter symbols=allDownlink, all symbols in the slot are DL symbols.
   If the higher-layer parameter symbols=allUplink, all symbols in the slot are UL symbols.
   If the higher-layer parameter symbols=explicit, the higher-layer parameter nrofDownlinkSymbols provides the number of first DL symbols in the slot, and the higher-layer parameter nrofUplinkSymbols provides the number of last UL symbols in the slot. If the higher-layer parameter nrofDownlinkSymbols is not provided, this implies that there are no first DL symbols in the slot. If the higher-layer parameter nrofUplinkSymbols is not provided, this implies that there are no last UL symbols in the slot. The remaining symbols in the slot are flexible symbols.

For each slot having an index provided by a higher-layer parameter slotIndex, the UE applies a (slot) format provided by a corresponding symbols. The UE does not expect the higher-layer parameter TDD-UL-DL-ConfigurationDedicated to indicate, as UL or DI, a symbol that the higher-layer parameter TDD-U-DL-ConfigurationCommon indicates as DL or UL.

For each slot configuration provided by the higher-layer parameter TDD-UL-DL-ConfigurationDedicated, a reference SCS configuration is the reference SCS configuration $\mu_{ref}$ provided by the higher-layer parameter TDD-UL-DL-ConfigurationCommon.

A slot configuration periodicity and the number of DL/UL/flexible symbols in each slot of the slot configuration periodicity is determined based on the higher-layer parameters TDD-UL-DL-ConfigurationCommon and TDD-UL-DL-ConfigurationDedicated, and the information is common to each configured BWP.

The UE considers symbols in a slot indicated as DL by the higher-layer parameter TDD-UL-DL-ConfigurationCommon TDD-UL-DL-ConfigurationDedicated to be available for signal reception. Further, the UE considers symbols in a slot indicated as UL by the higher-layer parameter TDD-UL-DL-ConfigurationCommon or TDD-UL-DL-ConfigurationDedicated to be available for signal transmission.

If the UE is not configured to monitor a PDCCH for DCI format 2_0, for a set of symbols of a slot that are indicated as flexible by the higher-layer parameter TDD-UL-DL-ConfigurationCommon or TDD-UL-DL-ConfigurationDedicated, or when the higher-layer parameters TDD-UL-DL-ConfigurationCommon and TDD-UL-DL-ConfigurationDedicated are not provided to the UE, the UE may operate as follows.

The UE may receive a PDSCH or a CSI-RS in the set of symbols of the slot, when the UE receives a corresponding indication by DCI format 1_9, DCI format 1_1, or DCI format 0_1.
   The UE may transmit a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

It is assumed that the UE is configured by the higher layer to receive a PDCCH, a PDSCH, or a CSI-RS in a set of symbols of a slot. When the UE does not detect DCI format DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE may receive the PDCCH, the PDSCH, or the CSI-RS. Otherwise, that is, when the UE detects DCI format 0_0, DCI format 0_1, DCI format 1_0, DCI format 1_1, or DCI format 2_3 that indicates to the UE to transmit a PUSCH, a PUCCH, a PRACH, or an SRS in at least one symbol of the set of symbols of the slot, the UE does not receive the PDCCH, the PDSCH, or the CSI-RS in the set of symbols of the slot.

When the UE is configured by the higher layer to transmit an SRS, a PUCCH, a PUSCH, or a PRACH in a set of symbols of a slot and detects DCI format 1_0, DCI format 1_1, or DCI format 0_1 indicating to the UE to receive a CSI-RS or a PDSCH in a subset of symbols from the set of symbols, the UE operates as follows.

The UE does not expect to cancel signal transmission in a subset of symbols that occur after fewer symbols than a PUSCH preparation time $T_{proc,2}$ for a corresponding UE processing capability on the assumption that $d_{2,1}=1$, relative to the last symbol of a CORESET in which the UE detects DCI format 1_0, DCI format 1_1, or DCI format 0_1.
   The UE cancels the PUSCH, PUSCH, or PRACH transmission in the remaining symbols of the set of symbols, and cancels the SRS transmission in the remaining symbols of the set of symbols.

For a set of symbols of a slot that are indicated as UL by the higher-layer parameter TDD-UL-DL-ConfigurationCommon or TDD-UL-DL-ConfigurationDedicated, the UE does not receive a PDSCH, a PDSCH, or a CSI-RS in the set of symbols of the slot.

For a set of symbols of a slot that are indicated as DL by the higher-layer parameter TDD-UL-DL-ConfigurationCommon or TDD-UL-DL-ConfigurationDedicated, the UE does not transmit a PUSCH, a PUCCH, a PRACH, or an SRS in the set of symbols of the slot.

For a set of symbols of a slot that are indicated as flexible by the higher-layer parameter TDD-UL-DL-ConfigurationCommon or TDD-UL-DL-ConfigurationDedicated, the UE does not expect to receive a dedicated configuration for transmission from the UE and a dedicated configuration for reception at the UE in the set of symbols of the slot.

For a set of symbols of a slot indicated by a higher-layer parameter ssb-PositionsInBurst in a higher-layer parameter SystemInformationBlockType1 or ServingCellConfigCommon, for reception of SS/PBCH blocks, the UE does not transmit a PUSCH, a PUSCH, or a PRACH in the slot if a transmission overlaps with any symbol of the set of symbols, and the UE does not transmit an SRS in the set of symbols of the slot. When the higher-layer parameter TDD-UL-DL-ConfigurationCommon or TDD-UL-DL-ConfigDedicated is provided to the UE, the UE does not expect the set of symbols of the slot to be indicated as UL by the higher-layer parameter.

For a set of symbols of a slot corresponding to a valid PRACH occasion, and $N_{gap}$ symbols before the valid PRACH occasion, when a signal reception overlaps with any symbol of the set of symbols in the slot, the UE does not receive a PDCCH, a PDSCH, or a CSI-RS for a Type1-PDCCH CSS set. The UE does not expect the set of symbols of the slot to be indicated as DL by the higher-layer parameter TDD-UL-DL-ConfigurationCommon or TDD-UL-DL-ConfigDedicated.

For a set of symbols of a slot indicated by a higher-layer parameter pdcch-ConfigSIB1 in an MIB for a CORESET for a Type0-PDCCH CSS set, the UE does not expect the set of symbols to be indicated as UL by the higher-layer parameter TDD-UL-DL-ConfigurationCommon or TDD-UL-DL-ConfigDedicated.

When the UE is scheduled by DCI format 1_1 to receive a PDSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a UL symbol, the UE does not receive the PDSCH in the slot.

When the UE is scheduled by DCI format 0_1 to transmit a PUSCH over multiple slots, and the higher-layer parameter TDD-UL-DL-ConfigurationCommon or TDD-UL-DL-ConfigDedicated indicates that, for one of the multiple slots, at least one symbol in a set of symbols in which the UE is scheduled to receive a PDSCH in the slot is a DL symbol, the UE does not transmit the PUSCH in the slot.

A detailed description will be given below of a UE operation for determining a slot format. The UE operation may apply for a serving cell included in a set of serving cells configured for a UE by higher-layer parameters slotFormatCombToAddModList and slotFormatCombToReleaseList.

If the UE is configured with a higher-layer parameter SlotFormatIndicator, the UE is provided with an SFI-RNTI by a higher-layer parameter sfi-RNTI and with a payload size of DCI format 2_0 by a higher-layer parameter dci-PayloadSize.

For one or more serving cells, the UE is also provided with a configuration for a search space set S and a corresponding CORESET P. The search space set S and the corresponding CORESET P may be provided for monitoring $M_{p,s}^{(L_{sn})}$ PDCCH candidates for DCI format 2_0 with a CCE aggregation level including $L_{SFI}$ CCEs.

The $M_{p,s}^{(L_{sn})}$ PDCCH candidates are the first $M_{p,s}^{(L_{sn})}$ PDCCH candidates for the CCE aggregation level $L_{SFI}$ for the search space set S in the CORESET P.

For each serving cell in the set of serving cells, the UE may be provided with the following information:

An ID of the serving cell based on a higher-layer parameter servingCellId.

A location of an SFI-index field in DCI format 2_0 based on a higher-layer parameter positionInDCI.

A set of slot format combinations based on a higher-layer parameter slotFormatCombinations, where each slot format combination in the set of slot format combinations includes the following information.

One or more slot formats based on a higher-layer parameter slotFormats for the slot format combination.

Mapping for the slot format combination provided by the higher-layer parameter slotFormats to a corresponding SFI-index field value in DCI format 2_0 provided by a higher-layer parameter slotFormatCombinationId.

For an unpaired spectrum operation, a reference SCS configuration $\mu_{SFI}$ based on a higher-layer parameter subcarrierSpacing. When a supplementary UL carrier is configured for the serving cell, a reference SCS configuration $\mu_{SFI,\,SUL}$ based on a higher-layer parameter subcarrierSpacing2 for the supplementary UL carrier.

For a paired spectrum operation, a reference SCS configuration $\mu_{SFI,\,DL}$ for a DL BWP based on the higher-layer parameter subcarrierSpacing and a reference SCS configuration $\mu_{SFI,\,UL}$ for an UL BWP based on the higher-layer parameter subcarrierSpacing2.

An SFI-index field value in DCI format 2_0 indicates to the UE a slot format for each slot in a number of slots for each DL BWP or each UL BWP starting from a slot in which the UE detects DCI format 2_0. The number of slots is equal to or larger than a PDCCH monitoring periodicity for DCI format 2_0. The SFI-index field includes max $\{\lceil \log_2 (\text{maxSFIinde x}+1\rceil,1\}$ bits where maxSFIindex is the maximum of the values provided by the corresponding higher-layer parameter slotFormatCombinationId. A slot format is identified by a corresponding format index as provided in Table 11 to Table 14. In Table 11 to Table 14, 'D' denotes a DL symbol, 'U' denotes a UL symbol, and 'F' denotes a flexible symbol. In Table 11 to Table 14, 'D' denotes a DL symbol, 'U' denotes a UL symbol, and 'F' denotes a flexible symbol.

TABLE 7

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | F | F | F | F | F |
| 7 | D | D | D | D | D | D | D | F | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |

TABLE 8

| 15 | F | F | F | F | F | F | U | U | U | U | U | U | U | U |
|---|---|---|---|---|---|---|---|---|---|---|---|---|---|---|
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |

TABLE 8-continued

| 21 | D | D | D | F | F | F | F | F | F | F | F | F | F | U |
|---|---|---|---|---|---|---|---|---|---|---|---|---|---|---|
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | F | U | U |
| 32 | D | D | D | D | D | D | D | D | D | F | F | U | U | |

TABLE 9

| 33 | D | D | D | D | D | D | D | D | F | F | F | U | U |
|---|---|---|---|---|---|---|---|---|---|---|---|---|---|
| 34 | D | F | U | U | U | U | U | U | U | U | U | U | U |
| 35 | D | D | F | U | U | U | U | U | U | U | U | U | U |
| 36 | D | D | D | F | U | U | U | U | U | U | U | U | U |
| 37 | D | F | F | U | U | U | U | U | U | U | U | U | U |
| 38 | D | D | F | F | U | U | U | U | U | U | U | U | U |
| 39 | D | D | D | F | F | U | U | U | U | U | U | U | U |
| 40 | D | F | F | F | U | U | U | U | U | U | U | U | U |
| 41 | D | D | F | F | F | U | U | U | U | U | U | U | U |
| 42 | D | D | D | F | F | F | U | U | U | U | U | U | U |
| 43 | D | D | D | D | D | D | D | F | F | F | F | U | |
| 44 | D | D | D | D | D | F | F | F | F | F | F | U | U |
| 45 | D | D | D | D | D | F | F | U | U | U | U | U | U |

TABLE 10

| 46 | D | D | D | D | F | U | D | D | D | D | D | F | U |
|---|---|---|---|---|---|---|---|---|---|---|---|---|---|
| 47 | D | D | F | U | U | U | D | D | F | U | U | U | U |
| 48 | D | F | U | U | U | U | D | F | U | U | U | U | U |
| 49 | D | D | D | F | F | U | D | D | D | D | F | F | U |
| 50 | D | D | F | F | U | U | D | D | D | F | F | U | U |
| 51 | D | F | F | U | U | U | D | F | F | U | U | U | U |
| 52 | D | F | F | F | F | U | D | F | F | F | F | F | U |
| 53 | D | D | F | F | F | U | D | D | F | F | F | F | U |
| 54 | F | F | F | F | F | F | D | D | D | D | D | D | D |
| 55 | D | D | F | F | U | U | U | D | D | D | D | D | |
| 56–254 | | | | | | | Reserved | | | | | | |
| 255 | | | | | | UE determines the slot format for the slot based on TDD-UL-DL-ConfigurationCommon, or TDD-UL-DL-ConfigDedicated and, if any, on detected DCI formats | | | | | | | |

If a PDCCH monitoring periodicity for DCI format 2_0, provided to the UE for the search space set S by a higher-layer parameter monnoringSlotPeriodicityAndOffset, is smaller than the duration of a slot format combination that the UE obtains in a PDCCH monitoring occasion for DCI format 2_0 by a corresponding SFI-index field value, and the UE detects more than one DCI format 2_0 indicating a slot format for a slot, the UE expects each of the more than one DCI format 2_0 to indicate the same (slot) format for the slot.

The UE does not expect to be configured to monitor a PDCCH for DCI format 2_0 on a second serving cell that uses a larger SCS than the serving cell.

For an unpaired spectrum operation of the UE on a serving cell, the UE is provided, by a higher-layer parameter subcarrierSpacing, with a reference SCS configuration $\mu_{SFI}$ for each slot format in a combination of slot formats indicated by an SFI-index field value in DCI format 2_0. The UE expects that for a reference SCS configuration $\mu_{SFI}$ and for an SCS configuration $\mu$ for an active DL BWP or an active UL BWP, $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP in which the first slot starts at the same time as the first slot for the reference SCS configuration $\mu_{SFI}$. Each DL or flexible or UL symbol for the reference SCS configuration $\mu_{SFI}$ corresponds to $2^{(\mu-\mu_{SFI})}$ consecutive DL or flexible or UL symbols for the SCS configuration $\mu$.

For a paired spectrum operation of the UE on a serving cell, the SFI-index field in DCI format 2_0 includes a combination of slot formats for a reference DL BWP and a combination of slot formats for a reference UL BWP of the serving cell. The UE is provided with a reference SCS configuration $\mu_{SFI}$ for each slot format in the combination of slot formats indicated by the value. For the reference SCS configuration $\mu_{SFI}$ and an SCS configuration $\mu$ for the active DL BWP or the active UL BWP, the UE expects that $\mu \geq \mu_{SFI}$. The UE is provided, by a higher-layer parameter subcarrierSpacing, with a reference SCS configuration $\mu_{SFI, DL}$ for the combination of slot formats indicated by the SFI-index field value in DCI format 2_0 for the reference DL BWP of the serving cell. The UE is provided, by a higher-parameter subcarrierSpacing2, with a reference SCS configuration $\mu_{SFI, UL}$ for the combination of slot formats indicated by the SFI-index field value in DCI format 2_0 for the reference UL BWP of the serving cell. If $\mu_{SFI, DL} \geq \mu_{SFI, UL}$, for each $2^{(\mu_{SFI, DL}-\mu_{SFI, UL})}+1$ value provided by a value of the higher-layer parameter slotFormats, the value of the higher-layer parameter slotFormats is determined based on a value of the higher-layer parameter slotFormatCombinationId in the higher-layer parameter slotFormatCombination, the value of the higher-layer parameter slotFormatCombinationId is set based on the value of the SFI-index field value in DCI format 2_0, the first $2^{(\mu_{SFI, DL}-\mu_{SFI, UL})}$ values for the combination of slot formats are applicable to the reference DL BWP, and the next value is applicable to the reference UL BWP. If $\mu_{SFI, DL} < \mu_{SFI, UL}$, for each $2^{(\mu_{SFI, UL}-\mu_{SFI, DL})}+1$ value provided by the higher-layer parameter slotFormats, the first value for the combination of slot formats is applicable to the reference DL BWP and the next $2^{(\mu_{SFI, UL}-\mu_{SFI, DL})}$ values are applicable to the reference UL BWP.

For a set of symbols of a slot, the UE does not expect to detect DCI format 2_0 with an SFI-index field value indicating the set of symbols in the slot as UL and to detect DCI format 1_0, DCI format 1_1, or DCI format 0_1 indicating to the UE to receive a PDSCH or a CSI-RS in the set of symbols of the slot.

For a set of symbols of a slot, the UE does not expect to detect DCI format 2_0 with an SFI-index field value indicating the set of symbols in the slot as DL and to detect DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot.

For a set of symbols of a slot that are indicated as DL/UL by the higher-layer parameter TDD-UL-DL-ConfigurationCommon, or TDDUL-DL-ConfigDedicated, the UE does not expect to detect DCI format 2_0 with an SFI-index field value indicating the set of symbols of the slot as UL/DL, respectively, or as flexible.

For a set of symbols of a slot indicated to the UE by the higher-layer parameter ssb-PositionsInBurst in a higher-layer parameter SystemInformationBlockType1 or ServingCellConfigCommon for reception of SS/PBCH blocks, the UE does not expect to detect DCI format 2_0 with an SFI-index field value indicating the set of symbols of the slot as UL.

For a set of symbols of a slot indicated to the UE by a higher-layer parameter prach-ConfigurationIndex in a higher-layer parameter RACH-ConfigCommon for PRACH transmissions, the UE does not expect to detect DCI format 2_0 with an SFI-index field value indicating the set of symbols of the slot as DL.

For a set of symbols of a slot indicated to the UE by a higher-layer parameter pdcch-ConfigSIB1 in MIB for a CORESET for a Type0-PDCCH CSS set, the UE does not expect to detect DCI format 2_0 with an SFI-index field value indicating the set of symbols of the slot as UL.

For a set of symbols of a slot indicated to the UE as flexible by the higher-layer parameter TDD-UL-DL-ConfigurationCommon and the higher-layer parameter TDD-UL-DLConfigDedicated, or when the higher-layer parameter TDD-UL-DL-ConfigurationCommon and the higher-layer parameter TDD-UL-DL-ConfigDedicated are not provided to the UE, if the UE detects DCI format 2_0 providing a slot format corresponding to a slot format value other than 255,

- if one or more symbols in the set of symbols are symbols in a CORESET configured for the UE for PDCCH monitoring, the UE receives a PDCCH in the CORESET only if an SFI-index field value in DCI format 2_0 indicates that the one or more symbols are DL symbols.
- if the SFI-index field value in DCI format 2_0 indicates the set of symbols of the slot as flexible and the UE detects DCI format 1_0, DCI format 1_1, or DCI format 0_1 indicating to the UE to receive a PDSCH or a CSI-RS in the set of symbols of the slot, the UE receives a PDSCH or a CSI-RS in the set of symbols of the slot.
- if the SFI-index field value in DCI format 2_0 indicates the set of symbols of the slot as flexible and the UE detects DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE transmits the PUSCH, PUCCH, PRACH, or SRS in the set of symbols of the slot.
    - if the SFI-index field value in DCI format 2_0 indicates the set of symbols of the slot as flexible, and the UE does not detect DCI format 1_0, DCI format 1_1, or DCI format 0_1 indicating to the UE to receive a PDSCH or a CSI-RS, or the UE does not detect DCI format 0_0, DCI format 0_1, DCI format 1_0, DCI format 1_1, DCI format 2_3, or an RAR UL grant indicating to the UE to transmit a PUSCH, a PUCCH, a PRACH, or an SRS in the set of symbols of the slot, the UE does not transmit or receive a signal in the set of symbols of the slot.
- if the UE is configured by the higher layer to receive a PDSCH or a CSI-RS in the set of symbols of the slot, the UE receives the PDSCH or the CSI-RS in the set of symbols of the slot, only if the SFI-index field value in DCI format 2_0 indicates the set of symbols of the slot as DL.
- if the UE is configured by the higher layer to transmit a PUCCH, a PUSCH, or a PRACH in the set of symbols of the slot, the UE transmits the PUCCH, or the PUSCH, or the PRACH in the slot only if the SFI-index field value in DCI format 2_0 indicates the set of symbols of the slot as UL.
- if the UE is configured by the higher layer to transmit an SRS in the set of symbols of the slot, the UE transmits the SRS only in a subset of symbols from the set of symbols of the slot indicated as UL symbols by the SFI-index field value in DCI format 2_0.
- the UE does not expect to detect an SFI-index field value in DCI format 2_0 indicating the set of symbols of the slot as DL and also detect DCI format 0_0, DCI format 0_1, DCI format 1_0, DCI format 1_1, DCI format 2_3, or an RAR UL grant indicating to the UE to transmit an SRS, a PUSCH, a PUCCH, or a PRACH, in one or more symbols from the set of symbols of the slot.
- the UE does not expect to detect an SFI-index field value in DCI format 2_0 indicating the set of symbols of the slot as DL or flexible, if the set of symbols of the slot includes symbols corresponding to any repetition of a PUSCH transmission activated by a UL Type 2 grant PDCCH.
- the UE does not expect to detect an SFI-index field value in DCI format 2_0 indicating the set of symbols of the slot as UL and also detect DCI format 1_0 or DCI format 1_1 or DCI format 0_1 indicating to the UE to receive a PDSCH or a CSI-RS in one or more symbols from the set of symbols of the slot.

If the UE is configured by the higher layer to receive a CSI-RS or a PDSCH in a set of symbols of a slot and detects DCI format 2_0 indicating a subset of symbols from the set of symbols as UL or flexible or DCI format 0_0, DCI format 0_1, DCI format 1_0, DCI format 1_1, or DCI format 2_3 indicating to the UE to transmit a PUSCH, a PUCCH, an SRS, or a PRACH in at least one symbol in the set of symbols, the UE cancels the CSI-RS reception or the PDSCH reception in the slot.

If the UE is configured by the higher layer to transmit an SRS, a PUCCH, or a PUSCH, or a PRACH in a set of symbols of a slot and detects DCI format 2_0 with a slot format value indicating a subset of symbols from the set of symbols as DL or flexible, or DCI format 1_0, DCI format 1_1, or DCI format 0_1 indicating to the UE to receive a CSI-RS or a PDSCH in at least one symbol in the set of symbols, then

- the UE does not expect to cancel the signal transmission in the subset of symbols that occur, relative to a last symbol of a CORESET in which the UE detects DCI format 2_0, DCI format 1_0, DCI format 1_1, or DCI format 0_1, after fewer symbols than a PUSCH preparation time $T_{proc,2}$ for the corresponding PUSCH processing capability.
- the UE cancels the PUCCH, or PUSCH, or PRACH transmission in the remaining symbols in the set of symbols and cancels the SRS transmission in the remaining symbols in the set of symbols.

If the UE does not detect DCI format 2_0 indicating the set of symbols of the slot as flexible or UL or DCI format 0_0, DCI format 0_1, DCI format 1_0, DCI format 1_1, or DCI format 2_3 indicating to the UE to transmit an SRS, a PUSCH, a PUCCH, or a PRACH in the set of symbols, the UE assumes that flexible symbols in a CORESET configured for the UE for PDCCH monitoring are DL symbols.

For a set of symbols of a slot that are indicated as flexible by the higher-layer parameters TDD-UL-DL-ConfigurationCommon and TDD-UL-DLConfigDedicated, or when the higher-layer parameters TDD-UL-DL-ConfigurationCommon, and TDD-UL-DL-ConfigDedicated are not provided to the UE, if the UE does not detect DCI format 2_0 providing a slot format for the slot,

- the UE receives a PDSCH or a CSI-RS in the set of symbols of the slot, if the UE receives a corresponding indication by DCI format 1_0, DCI format 1_1, or DCI format 0_1.
- the UE transmits a PUSCH, a PUCCH, a PRACH, or an SRS in the set of symbols of the slot, if the UE receives a corresponding indication by DCI format 0_0, DCI format 0_1, DCI format 1_0, DCI format 1_1, or DCI format 2_3.

the UE may receive a PDCCH.
  if the UE is configured by the higher layer to receive a PDSCH or a CSI-RS in the set of symbols of the slot,
    the UE does not receive the PDSCH or the CSI-RS in the set of symbols of the slot.
  if the UE is configured by the higher layer to transmit an SRS, a PUCCH, a PUSCH, or a PRACH in the set of symbols of the slot,
    the UE does not transmit the PUCCH, the PUSCH, or the PRACH in the slot and does not transmit the SRS in symbols from the set of symbols in the slot, if any, starting from a symbol that is a number of symbols equal to the PUSCH preparation time N2 for the corresponding PUSCH timing capability after a last symbol of a CORESET where the UE is configured to monitor PDCCH for DCI format 2_0.
The UE does not expect to cancel the transmission of the SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a CORESET where the UE is configured to monitor a PDCCH for DCI format 2_0.

2. Unlicensed Band System

FIG. 17 illustrates an exemplary wireless communication system supporting an unlicensed band, which is applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 17 (a), the LCC and the UCC may be set to a primary CC (PCC) and a secondary CC (SCC), respectively.

The BS and UE may transmit and receive signals on one UCC or on a plurality of UCCs where the carrier aggregation is applied as shown in FIG. 17 (b). In other words, the BS and UE may transmit and receive on UCC(s) with no LCC.

Signal transmission and reception operations in U-bands, which will be described later in the present disclosure, may be applied to all of the aforementioned deployment scenarios (unless specified otherwise).

2.1. Radio Frame Structure for U-Band

For operation in U-bands, LTE frame structure type 3 (see FIG. 3) or the NR frame structure (see FIG. 7) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., Subframe configuration for LAA' field, etc.), which is received in subframe #n−1 or subframe #n from the BS.

Table 11 shows how the Subframe configuration for LAA field indicates the configuration of OFDM symbols used to transmit DL physical channels and/or physical signals in the current or next subframe.

TABLE 11

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the 'UL duration and offset' field in detected DCI.

Table 12 shows how the UL duration and offset field indicates the configurations of a UL offset and a UL duration.

TABLE 12

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |

TABLE 12-continued

| Value of<br>'UL duration and offset' field | UL offset, l<br>(in subframes) | UL duration, d<br>(in subframes) |
|---|---|---|
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset l and UL a duration d for subframe #n, the UE may not need to receive DL physical channels and/or physical signals in subframe #n+l+i (where i=0, 1, . . . , d−1).

2.2. Downlink Channel Access Procedures

To transmit a DL signal in a U-band, a BS may perform a channel access procedure (CAP) for the U-band as follows. In the following description, it is assumed that a BS is basically configured with a PCell corresponding to an L-band and at least one SCell, each corresponding to a U-band. The U-band may be referred to as a licensed assisted access (LAA) SCell. Hereinafter, a description will be given of DL CAP operation applicable to the present disclosure. In this case, the DL CAP operation may be equally applied when the BS is configured only with U-bands.

2.2.1. Channel Access Procedure for Transmission(s) Including PDSCH/PDCCH/EPDCCH A BS may transmit a transmission including a PDSCH/PDCCH/EPDCCH on a carrier on which LAA SCell(s) transmission(s) are performed after sensing whether the channel is idle during the slot durations of a defer duration $T_d$ and after a counter N becomes zero in step 4. In this case, the counter N is adjusted by sensing the channel for an additional slot duration according to the following steps.

1) N is set to $N_{init}$ (N=$N_{init}$), where $N_{init}$ is a random number uniformly distributed between 0 and $CW_p$. Then, step 4 proceeds.

2) If N>0 and the BS chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The CAP for the transmission including the PDSCH/PDCCH/EPDCCH performed by the BS may be summarized as follows.

FIG. 18 is a diagram for explaining a CAP for U-band transmission applicable to the present disclosure.

For DL transmission, a transmission node (e.g., BS) may initiate a CAP to operate in LAA SCell(s), each corresponding to a U-band cell (S1810).

The BS may randomly select a backoff counter N within a contention window (CW) according to step 1. In this case, N is set to an initial value, $N_{init}$ (S1820). $N_{init}$ may have a random value between 0 and $CW_p$.

If the backoff counter value (N) is 0 (YES in S1830), the BS terminates the CAP according to step 4 (S1832). Then, the BS may transmit a transmission (Tx) burst including the PDSCH/PDCCH/EPDCCH (S1834). If the backoff counter value is non-zero (NO in S1830), the BS decreases the backoff counter value by 1 according to step 2 (S1840).

The BS checks whether the channel of the LAA SCell(s) is idle (S1850). If the channel is idle (YES in S1850), the BS checks whether the backoff counter value is 0 (S1830).

If the channel is not idle in S1850, that is, if the channel is busy (NO in S1850), the BS checks whether the corresponding channel is idle during the defer duration $T_d$ (longer than or equal to 25 usec), which is longer than the slot duration (e.g., 9 usec), according to step 5 (S1860). If the channel is idle (YES in S1870), the BS may resume the CAP.

For example, when the backoff counter value $N_{init}$ (N?) is 10, if the channel is determined to be busy after the backoff counter value is reduced to 5, the BS determines whether the channel is idle by sensing the channel during the defer duration. In this case, if the channel is idle during the defer duration, the BS performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the BS performs steps S1860 again to check whether the channel is idle during a new defer duration.

When the BS does not transmit the transmission including the PDSCH/PDCCH/EPDCCH on the carrier on which the LAA SCell(s) transmission(s) are performed after step 4 in the above procedure, the BS may transmit the transmission including the PDSCH/PDCCH/EPDCCH on the carrier if the following conditions are satisfied:

When the BS is ready to transmit the PDSCH/PDCCH/EPDCCH and the channel is sensed to be idle at least in a slot duration $T_{sl}$; and when the channel is sensed to be idle during all the slot durations of the defer duration $T_d$ immediately before the transmission.

If the channel is sensed not to be idle during the slot duration $T_{sl}$ when the BS senses the channel after being ready to transmit or if the channel is sensed not to be idle during any one of the slot durations of the defer duration $T_d$ immediately before the intended transmission, the BS proceeds to step 1 after sensing the channel to be idle during the slot durations of the defer duration $T_d$.

The defer duration $T_d$ includes a duration $T_f$ (=16 us) immediately followed by $m_p$ consecutive slot durations. Here, each slot duration ($T_{sl}$) is 9 us long, and $T_f$ includes an idle slot duration $T_{sl}$ at the start thereof.

When the BS senses the channel during the slot duration $T_{sl}$, if the power detected by the BS for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents the CW. The adjustment of $CW_p$ will be described in detail in section 2.2.3.

$CW_{min,p}$ and $CW_{max,p}$ are selected before step 1 of the above procedure.

$m_p$, $CW_{min,p}$, and $CW_{max,p}$ are determined based on channel access priority classes associated with transmissions at the BS (see Table 13 below).

The adjustment of $X_{Thresh}$ will be described in section 2.2.4.

TABLE 13

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

When N>0 in the above procedure, if the BS transmits a discovery signal not including the PDSCH/PDCCH/EPDCCH, the BS may not decrease the counter N during slot duration(s) overlapping with the discovery signal transmission.

The BS may not continuously perform transmission on the carrier on which the LAA SCell(s) transmission(s) are performed for a period exceeding $T_{mcot,p}$ in Table 13 above.

For p=3 and p=4 in Table 13 above, if the absence of any other technologies sharing the carrier can be guaranteed on a long term basis (e.g. by level of regulation), $T_{mcot,p}$ is set to 10 ms. Otherwise, $T_{mcot,p}$ is set to 8 ms.

2.2.2. Channel Access Procedure for Transmissions Including Discovery Signal Transmission(s) and not Including PDSCH When a BS has a transmission duration less than or equal to 1 ms, the BS may performs transmission including a discovery signal but not including a PDSCH on a carrier on which LAA SCell(s) transmission(s) are performed immediately after sensing that the channel is idle at least for a sensing interval $T_{drs}$ of 25 us. $T_{drs}$ includes a duration $T_f$ (=16 us) immediately followed by one slot duration $T_{sl}$ of 9 us. $T_f$ includes an idle slot duration $T_{sl}$ at the start thereof. When the channel is sensed to be idle during the slot durations of $T_{drs}$, the channel is considered to be idle for $T_{drs}$.

2.2.3. Contention Window Adjustment Procedure

If a BS transmits transmissions including PDSCHs that are associated with the channel access priority class p on a carrier, the BS maintains the CW value $CW_p$ and adjusts $CW_p$ for the transmissions before step 1 of the procedure described in section 2.2.1 (i.e., before performing the CAP) according to the following steps.

1> For every priority class p∈{1,2,3,4}, $CW_p$ is set to $CW_{min,p}$.

2> If at least Z=80% of HARQ-ACK values corresponding to PDSCH transmission(s) in reference subframe k are determined as NACK, $CW_p$ for every priority class p∈{1,2,3,4} increases to a next higher allowed value, and step 2 remains. Otherwise, step 1 proceeds.

In other words, the probability that the HARQ-ACK values corresponding to the PDSCH transmission(s) in reference subframe k are determined as NACK is at least 80%, the BS increases the CW values configured for the individual priority classes to next higher allowed values, respectively. Alternatively, the BS may maintain the CW value configured for each priority class as an initial value.

In this case, reference subframe k is the starting subframe of the most recent transmission on the carrier made by the BS, for which at least some HARQ-ACK feedback is expected to be available.

The BS may adjust the value of $CW_p$ for every priority class p∈{1,2,3,4} based on given reference subframe k only once.

If $CW_p=CW_{max, p}$, the next higher allowed value for adjusting $CW_p$ is $CW_{max, p}$.

To determine the probability Z that the HARQ-ACK values corresponding to the PDSCH transmission(s) in reference subframe k are determined as NACK, the following may be considered.

When the BS's transmission(s) for which HARQ-ACK feedback is available start in the second slot of subframe k, HARQ-ACK values corresponding to PDSCH transmission(s) in subframe k+1 are also used in addition to the HARQ-ACK values corresponding to the PDSCH transmission(s) in subframe k.

When the HARQ-ACK values correspond to PDSCH transmission(s) on an LAA SCell that are assigned by a (E)PDCCH transmitted on the same LAA SCell, If no HARQ-ACK feedback is detected for a PDSCH transmission by the BS, or if the BS detects 'DTX' state, 'NACK/DTX' state, or 'any' state, it is counted as NACK.

When the HARQ-ACK values correspond to PDSCH transmission(s) on an LAA SCell that are assigned by a (E)PDCCH transmitted on another serving cell, If the HARQ-ACK feedback for a PDSCH transmission is detected by the BS, the 'NACK/DTX' state or the 'any' state is counted as NACK and the 'DTX' state is ignored.

If no HARQ-ACK feedback is detected for a PDSCH transmission by the BS,

If PUCCH format 1b with channel selection, which is configured by the BS, is expected to be used by the UE, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

When a PDSCH transmission has two codewords, the HARQ-ACK value of each codeword is considered separately.

Bundled HARQ-ACKs across M subframes are considered as M HARQ-ACK responses.

If the BS transmits transmissions including a PDCCH/EPDCCH with DCI format 0A/0B/4A/4B and not including a PDSCH that are associated with the channel access priority class p on a channel starting from time to, the BS maintains the CW value $CW_p$ and adjusts $CW_p$ for the transmissions before step 1 of the procedure described in section 2.2.1 (i.e., before performing the CAP) according to the following steps.

1> For every priority class p∈{1,2,3,4}, $CW_p$ is set to $CW_{min, p}$.

2> If less than 10% of the UL transport blocks scheduled for the UE by the BS according to a Type 2 CAP (which will be described in section 2.3.1.2) in a time interval from $t_0$ and $t_0+T_{CO}$ are received successfully, $CW_p$ for every priority class p∈{1,2,3,4} increases to a next higher allowed value, and step 2 remains. Otherwise, step 1 proceeds.

The calculation of $T_{CO}$ will be described in section 2.3.1.

If $CW_p=CW_{max, p}$ is consecutively used K times to generate $N_{init}$, $CW_p$ is reset to $CW_{min, p}$ only for the priority class p for which $CW_p=CW_{mx, p}$ is consecutively used K times to generate $N_{init}$. In this case, K is selected by the BS from a set of values {1, 2, . . . , 8} for each priority class p∈{1,2,3,4}.

2.2.4. Energy Detection Threshold Adaptation Procedure

A BS accessing a carrier on which LAA SCell(s) transmission(s) are performed may set an energy detection threshold ($X_{Thresh}$) to be less than or equal to a maximum energy detection threshold $X_{Thresh\_max}$.

The maximum energy detection threshold $X_{Thresh\_max}$ is determined as follows.

If the absence of any other technologies sharing the carrier can be guaranteed on a long term basis (e.g., by level of regulation), $$X_{Thresh\_max} = \min\begin{Bmatrix} T_{max} + 10 \text{ dB,} \\ X_r \end{Bmatrix}$$

$X_r$ is a maximum energy detection threshold defined by regulatory requirements in dBm when such requirements are defined. Otherwise, $X_r = T_{max} + 10$ dB.

Otherwise, $$X_{Thres\_max} = \max\begin{Bmatrix} -72 + 10 \cdot \log10(BWMHz/20 \text{ MHz}) \, dBm, \\ \min\begin{Bmatrix} T_{max}, \\ T_{max} - T_A + (P_H + 10 \cdot \log10(BWMHz/20 \text{ MHz}) - P_{TX}) \end{Bmatrix} \end{Bmatrix}$$

Each variable is defined as follows:
- $T_A = 10$ dB for transmission(s) including PDSCH:
- $T_A = 5$ dB for transmissions including discovery signal transmission(s) and not including PDSCH;
- $P_H = 23$ dBm;
- $P_{TX}$ is the set maximum eNB output power in dBm for the carrier;
  - eNB uses the set maximum transmission power over a single carrier irrespective of whether single carrier or multi-carrier transmission is employed
- $T_{max}(dBm) = 10 \cdot \log 10 \, (3.16228 \cdot 10^{-8} \, (mW/MHz) \cdot BWMHz \, (MHz))$:
- BWMHz is the single carrier bandwidth in MHz

2.2.5. Channel Access Procedure for Transmission(s) on Multiple Carriers

A BS may access multiple carriers on which LAA SCell(s) transmission(s) are performed according to one of the following Type A or Type B procedures.

2.2.5.1. Type A Multi-Carrier Access Procedures

A BS may perform channel access on each carrier $c_i \in C$ according to the aforementioned procedures, where C is a set of carriers on which the BS intends to transmit, and i=0, 1, ..., q−1, where q is the number of carriers on which the BS intends to transmit.

The counter N described in section 2.2.1 (i.e., the counter N considered in the CAP) is determined for each carrier $c_i$. The counter for each carrier is denoted as $N_{c_i}$. $N_{c_i}$ is maintained according to clause 2.2.5.1.1 or 2.2.5.1.2.

2.2.5.1.1. Type A1

The counter N described in section 2.2.1 (i.e., the counter N considered in the CAP) is independently determined for each carrier $c_i$, and the counter for each carrier is denoted as $N_{c_i}$.

When the BS ceases transmission on any one carrier $c_j \in C$ for each carrier (where $c_i \neq c_j$), if the absence of any other technologies sharing the carrier cannot be guaranteed on a long term basis (e.g. by level of regulation), the BS may resume decreasing $N_{c_i}$ when an idle slot is detected after waiting for a duration of $4 \cdot T_{sl}$, or after reinitializing $N_{c_i}$.

2.2.5.1.2. Type A2

The counter N may be determined as described in section 2.2.1 for each carrier $c_j \in C$, and the counter for each carrier is denoted as $N_{c_j}$, where $c_j$ is a carrier having the largest $CW_p$ value. For each carrier $c_i$, $N_{c_i} = N_{c_j}$.

When a BS ceases transmission on any one carrier for which $N_{c_i}$ is determined, the BS reinitializes $N_{c_i}$ for all carriers.

2.2.5.2. Type B Multi-Carrier Access Procedure

A carrier $c_j \in C$ may be selected by a BS as follows.
- The BS uniformly randomly selects $c_j$ from C before performing transmission on multiple carriers $c_i \in C$, or
- The BS selects $c_j$ no more frequently than once every 1 second.

C is a set of carriers on which the BS intends to transmit, and i=0, 1, ..., q−1, where q is the number of carriers on which the BS intends to transmit.

To perform transmission on the carrier $c_j$, the BS performs channel access on the carrier $c_j$ according to the procedures described in section 2.2.1 with the following modifications, which will be described in 2.2.5.2.1 or 2.2.5.2.2.

To perform transmission on a carrier $c_i \neq c_j$ among carriers $c_i \in C$,

For each carrier $c_i$, the BS senses a carrier c for at least a sensing interval $T_{mc} = 25$ us immediately before transmission on the carrier $c_j$. Then, the BS may transmit on the carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such sensing for determining the idle state is performed on the carrier $c_j$ in the given interval $T_{mc}$.

The BS may not continuously perform transmission on the carrier $c_i \neq c_j$ (where $c_i \in C$) for a period exceeding $T_{mcot,p}$ given in Table 6, where $T_{mcot,p}$ is determined based on channel access parameters used for the carrier $c_j$.

2.2.5.2.1. Type B1

A single $CW_p$ value is maintained for a set of carriers C.

To determine $CW_p$ for channel access on a carrier $c_j$, step 2 of the procedure described in section 2.2.3 may be modified as follows.

If at least Z=80% of HARQ-ACK values corresponding to PDSCH transmission(s) in reference subframe k of all carriers $c_i \in C$ are determined as NACK, $CW_p$ for each priority class $p \in \{1,2,3,4\}$ increases to a next higher allowed value. Otherwise, step 1 proceeds.

2.2.5.2.2. Type B2

A $CW_p$ value is maintained independently for each carrier $c_i \in C$ according to the procedure described in section 2.2.3. To determine $N_{init}$ for a carrier $c_j$, the $CW_p$ value of a carrier $c_{j1} \in C$ is used, where $c_{j1}$ is a carrier with the largest $CW_p$ value among all carriers in the set C.

2.3. Uplink Channel Access Procedures

A UE and a BS scheduling UL transmission for the UE may perform the following procedures to access channel(s) on which LAA SCell(s) transmission(s) are performed. In the following description, it is assumed that a UE and a BS are basically configured with a PCell corresponding to an L-band and at least one SCell, each corresponding to a U-band. The U-band may be referred to as an LAA SCell. Hereinafter, a description will be given of UL CAP operation applicable to the present disclosure. In this case, the UL CAP operation may be equally applied when the UE and BS are configured only with U-bands.

2.3.1. Channel Access Procedure for Uplink Transmission(s)

A UE may access a carrier on which LAA SCell(s) UL transmission(s) are performed according to either a Type 1 UL CAP or a Type 2 UL CAP. The Type 1 CAP will be described in section 2.3.1.1, and the Type 2 CAP will be described in section 2.3.1.2.

If a UL grant scheduling PUSCH transmission indicates the Type 1 CAP, the UE performs the Type 1 CAP for transmitting transmissions including the PUSCH transmission unless specified otherwise in this clause.

If a UL grant scheduling PUSCH transmission indicates the Type 2 CAP, the UE performs the Type 2 CAP for transmitting transmissions including the PUSCH transmission unless specified otherwise in this clause.

The UE performs the Type 1 CAP for transmitting an SRS not including PUSCH transmission. A UL channel access priority class p=1 is used for SRS transmission including no PUSCH.

TABLE 14

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

When the 'UL configuration for LAA' field configures a 'UL offset' l and a 'UL duration' d for subframe n, If the end of UE transmission occurs in or before subframe n+l+d−1, the UE may use the Type 2 CAP for transmission in subframe n+l+i (where i=0, 1, . . . , d−1).

When the UE is scheduled to perform transmission including a PUSCH in a set of subframes $n_0, n_1, \ldots, n_{w-1}$ using PDCCH DCI format 0B/4B, if the UE is incapable of accessing a channel for transmission in subframe $n_k$, the UE shall attempt to make a transmission in subframe $n_{k+1}$ according to the channel access type indicated by DCI, where k∈{0, 1, . . . w−2}, and w is the number of scheduled subframes indicated by the DCI.

When the UE is scheduled to perform transmission including a PUSCH without gaps in a set of subframes $n_0, n_1, \ldots, n_{w-1}$ using one or more PDCCH DCI Format 0A/0B/4A/4B, if the UE performs transmission in subframe $n_k$ after accessing a carrier according to one of the Type 1 or Type 2 UL CAPs, the UE may continue transmission in subframes after $n_k$, where k∈{0, 1, . . . w−1}.

If the start of a UE transmission in subframe n+1 immediately follows the end of a UE transmission in subframe n, the UE is not expected to be indicated with different channel access types for the transmissions in the subframes.

When the UE is scheduled to perform transmission without gaps in subframes $n_0, n_1, \ldots, n_{w-1}$ using one or more PDCCH DCI Format 0A/0B/4A/4B, if the UE stops transmitting during or before subframe $n_{k1}$ (where k1∈{0, 1, . . . w−2}), and if the UE senses that the channel is continuously idle after stopping the transmission, the UE may transmit after subframe $n_{k2}$ (where k2∈{1, . . . w−1}) using the Type 2 CAP. If the UE senses that the channel is not continuously idle after stopping the transmission, the UE may transmit after subframe $n_{k2}$ (where k2∈{1, . . . w−1}) using the Type 1 CAP with a UL channel access priority class indicated by DCI corresponding to subframe $n_{k2}$.

When the UE receives a UL grant, if the DCI indicates the start of PUSCH transmission in subframe n using the Type 1 CAP, and if the UE has an ongoing Type 1 CAP before subframe n, If a UL channel access priority class value $p_1$ used for the ongoing Type 1 CAP is greater than or equal to a UL channel access priority class value $p_2$ indicated by the DCI, the UE may perform the PUSCH transmission in response to the UL grant by accessing the carrier based on the ongoing Type 1 CAP.

If the UL channel access priority class value $p_1$ used for the ongoing Type 1 CAP is smaller than the UL channel access priority class value $p_2$ indicated by the DCI, the UE terminates the ongoing CAP.

When the UE is scheduled to transmit on a set of carriers C in subframe n, if UL grants scheduling PUSCH transmissions on the set of carriers C indicate the Type 1 CAP, if the same 'PUSCH starting position' is indicated for all carriers in the set of carriers C, and if the carrier frequencies of the set of carriers C are a subset of one of the predetermined carrier frequency sets, The UE may perform transmission on a carrier $c_i \in C$ using the Type 2 CAP.

If the Type 2 CAP is performed on the carrier c, immediately before the UE performs transmission on a carrier $c_j \in C$ (where i≠j), and If the UE has accessed the carrier $c_j$ using the Type 1 CAP,
The UE selects the carrier $c_j$ uniformly and randomly from the set of carriers C before performing the Type 1 CAP on any carrier in the set of carriers C.

When the BS has transmitted on the carrier according to the CAP described in section 2.2.1, the BS may indicate the Type 2 CAP in DCI of a UL grant scheduling transmission including a PUSCH on a carrier in subframe n.

Alternatively, when the BS has transmitted on the carrier according to the CAP described in section 2.2.1, the BS may indicate using the 'UL configuration for LAA' field that the UE may perform the Type 2 CAP for transmission including a PUSCH on a carrier in subframe n.

Alternatively, when subframe n occurs within a time interval that starts at to and ends at $t_0+T_{CO}$, the eNB may schedule transmission including a PUSCH on a carrier in subframe n, which follows transmission by the BS on a carrier with a duration of $T_{short\_ul}$=25 us, where $T_{CO}=T_{mcot,p}+T_g$. The other variables are defined as follows.

$t_0$: a time instant when the BS starts transmission $T_{mcot,p}$: a value determined by the BS as described in section 2.2

$T_g$: the total duration of all gaps greater than 25 us that occur between DL transmission from the BS and UL transmission scheduled by the BS and between any two UL transmissions scheduled by the BS starting from $t_0$ The BS schedules UL transmissions between $t_0$ and $t_0+T_{CO}$ in consecutive subframes if the UL transmissions are capable of being scheduled contiguously.

For a UL transmission on a carrier that follows a transmission by the BS on the carrier within a duration of $T_{short\_ul}$=25 us, the UE may use the Type 2 CAP for the UL transmission.

If the BS indicates the Type 2 CAP for the UE in the DCI, the BS indicates the channel access priority class used to obtain access to the channel in the DCI.

2.3.1.1. Type 1 UL Channel Access Procedure

A UE may perform transmission using the Type 1 CAP after sensing a channel to be idle during the slot durations of a defer duration $T_d$ and after a counter N becomes zero in step 4. In this case, the counter N is adjusted by sensing a channel for additional slot duration(s) according to the following steps.

1) N is set to $N_{init}$ (N=$N_{init}$), where $N_{init}$ is a random number uniformly distributed between 0 and $CW_p$. Then, step 4 proceeds.

2) If N>0 and the UE chooses to decrease the counter, N is set to N−1 (N=N−1).

3) The channel for the additional slot duration is sensed. If the additional slot duration is idle, step 4 proceeds. Otherwise, step 5 proceeds.

4) If N=0, the corresponding process is stopped. Otherwise, step 2 proceeds.

5) The channel is sensed until either a busy slot is detected within an additional defer duration $T_d$ or all the slots of the additional defer duration $T_d$ are detected to be idle.

6) If the channel is sensed to be idle during all the slot durations of the additional defer duration $T_d$, step 4 proceeds. Otherwise, step 5 proceeds.

The Type 1 UL CAP performed by the UE may be summarized as follows.

For UL transmission, a transmission node (e.g., UE) may initiate a CAP to operate in LAA SCell(s), each corresponding to a U-band cell (S1810).

The UE may randomly select a backoff counter N within a CW according to step 1. In this case, N is set to an initial value, $N_{init}$ (S1820). $N_{init}$ may have a random value between 0 and $CW_p$.

If the backoff counter value (N) is 0 (YES in S1830), the UE terminates the CAP according to step 4 (S1832). Then, the UE may transmit a Tx burst (S1834). If the backoff counter value is non-zero (NO in S1830), the UE decreases the backoff counter value by 1 according to step 2 (S1840).

The UE checks whether the channel of the LAA SCell(s) is idle (S1850). If the channel is idle (YES in S1850), the UE checks whether the backoff counter value is 0 (S1830).

If the channel is not idle in S1850, that is, if the channel is busy (NO in S1850), the UE checks whether the corresponding channel is idle during the defer duration $T_d$ (longer than or equal to 25 usec), which is longer than the slot duration (e.g., 9 usec), according to step 5 (S1860). If the channel is idle (YES in S1870), the UE may resume the CAP.

For example, when the backoff counter value $N_{init}$ is 10, if the channel is determined to be busy after the backoff counter value is reduced to 5, the UE determines whether the channel is idle by sensing the channel during the defer duration. In this case, if the channel is idle during the defer duration, the UE performs the CAP again starting at the backoff counter value of 5 (or at 4 by decreasing the backoff counter value by 1), instead of configuring the backoff counter value $N_{init}$.

On the other hand, if the channel is busy during the defer duration (NO in S1870), the UE performs steps S1860 again to check whether the channel is idle during a new defer duration.

When the UE does not transmit the transmission including the PUSCH on the carrier on which the LAA SCell(s) transmission(s) are performed after step 4 in the above procedure, the UE may transmit the transmission including the PUSCH on the carrier if the following conditions are satisfied:

When the UE is ready to perform the transmission including the PUSCH and the channel is sensed to be idle at least in a slot duration $T_{sl}$, and When the channel is sensed to be idle during all the slot durations of the defer duration $T_d$ immediately before the transmission including the PUSCH.

If the channel is sensed not to be idle during the slot duration $T_{sl}$ when the UE senses the channel after being ready to transmit or if the channel is sensed not to be idle during any one of the slot durations of the defer duration $T_d$ immediately before the intended transmission including the PUSCH, the UE proceeds to step 1 after sensing the channel to be idle during the slot durations of the defer duration $T_d$.

The defer duration $T_d$ includes a duration $T_f$ (=16 us) immediately followed by $m_p$ consecutive slot durations. Here, each slot duration ($T_{sl}$) is 9 us long, and $T_f$ includes an idle slot duration $T_{sl}$ at the start thereof.

When the UE senses the channel during the slot duration $T_{sl}$, if the power detected by the UE for at least 4 us within the slot duration is less than an energy detection threshold X Thresh, the slot duration $T_{sl}$ is considered to be idle. Otherwise, the slot duration $T_{sl}$ is considered to be busy.

$CW_{min,p} \leq CW_p \leq CW_{max,p}$ represents the CW. The adjustment of $CW_p$ will be described in detail in section 2.3.2.

$CW_{min,p}$ and $CW_{max,p}$ are selected before step 1 of the above procedure.

$m_p$, $CW_{min,p}$, and $CW_{max,p}$ are determined based on channel access priority classes signalled to the UE (see Table 14 above).

The adjustment of $X_{Thresh}$ will be described in section 2.3.3.

2.3.1.2. Type 2 UL Channel Access Procedure

If a UE uses the Type 2 CAP for transmission including a PUSCH, the UE may transmit the transmission including the PUSCH immediately after sensing a channel to be idle for at least a sensing interval $T_{short\_ul}$=25 us. $T_{short\_ul}$ includes a duration $T_f$=16 us immediately followed by one slot duration $T_{sl}$=9 us, and $T_f$ includes an idle slot duration $T_{sl}$ at the start thereof. When the channel is sensed to be idle during the slot durations of $T_{short\_ul}$, the channel is considered to be idle for $T_{short\_ul}$.

2.3.2. Contention Window Adjustment Procedure

If a UE transmits transmissions using the Type 1 channel access procedure that are associated with the channel access priority class p on a carrier, the UE maintains the CW value $CW_p$ and adjusts $CW_p$ for the transmissions before step 1 of the procedure described in section 2.3.1 (i.e., before performing the CAP) according to the following steps.

If the value of a new data indicator (NDI) for at least one HARQ process associated with HARQ_ID_ref is toggled, For every priority class p∈{1,2,3,4}, $CW_p$ is set to $CW_{min,p}$.

Otherwise, $CW_p$ for every priority class p∈{1,2,3,4} increases to a next higher allowed value.

Here, HARQ_ID_ref refers to the ID of a HARQ process of a UL-SCH in reference subframe $n_{ref}$. Reference subframe $n_{ref}$ is determined as follows.

If the UE receives a UL grant in subframe $n_g$, subframe $n_w$ is the most recent subframe before subframe $n_g$−3 in which the UE has transmitted a UL-SCH using the Type 1 channel access procedure.

If the UE performs transmission including the UL-SCH without gaps starting from subframe $n_0$ and in subframes $n_0, n_1, \ldots, n_w$, reference subframe $n_{ref}$ is subframe $n_0$.

Otherwise, reference subframe $n_{ref}$ is subframe $n_w$.

When the UE is scheduled to perform transmission including a PUSCH without gaps in a set of subframes $n_0, n_1, \ldots, n_{w-1}$ using the Type 1 channel access procedure, if the UE is unable to perform any transmission including the PUSCH in the subframe set, the UE may maintain the value of $CW_p$ for every priority class $p \in \{1,2,3,4\}$ without any changes.

If the reference subframe for the last scheduled transmission is also $n_{ref}$, the UE may maintain the value of $CW_p$ for every priority class $p \in \{1,2,3,4\}$ to be the same as that for the last scheduled transmission including the PUSCH using the Type 1 channel access procedure.

If $CW_p = CW_{max,\ p}$, the next higher allowed value for adjusting $CW_p$ is $CW_{max,\ p}$.

If $CW_p = CW_{max,\ p}$ is consecutively used K times to generate $N_{init}$, $CW_p$ is reset to $CW_{min,\ p}$ only for the priority class p for which $CW_p = CW_{max,\ p}$ is consecutively used K times to generate $N_{init}$. In this case, K is selected by the UE from a set of values $\{1, 2, \ldots, 8\}$ for each priority class $p \in \{1,2,3,4\}$.

2.3.3. Energy Detection Threshold Adaptation Procedure

A UE accessing a carrier on which LAA SCell(s) transmission(s) are performed may set an energy detection threshold ($X_{Thresh}$) to be less than or equal to a maximum energy detection threshold $X_{Thresh\_max}$.

The maximum energy detection threshold $X_{Thresh\_max}$ is determined as follows.

If the UE is configured with a higher layer parameter 'imaxEnergyDetectionThreshold-r14', $X_{Thresh\_max}$ is set equal to a value signalled by the higher layer parameter.

Otherwise,

The UE shall determine $X'_{Thresh\_max}$ according to the procedure described in section 2.3.3.1.

If the UE is configured with a higher layer parameter 'maxEnergyDetectionThresholdOffset-r14'

$X_{Thresh\_max}$ is set by adjusting $X'_{Thresh\_max}$ according to an offset value signalled by the higher layer parameter.

Otherwise,

The UE sets $X_{Thresh\_max} = X'_{Thresh\_max}$.

2.3.3.1. Default Maximum Energy Detection Threshold Computation Procedure

If a higher layer parameter 'absenceOfAnyOtherTechnology-r14' indicates TRUE, $$X'_{Thresh\_max} = \min\left\{\begin{array}{l} T_{max} + 10 \text{ dB}, \\ X_r \end{array}\right\}.$$

$X_r$ is a maximum energy detection threshold defined by regulatory requirements in dBm when such requirements are defined. Otherwise, $X_r = T_{max} + 10$ dB.

Otherwise, $$X'_{Thres\_max} = $$
$$\max\left\{\begin{array}{l} -72 + 10 \cdot \log 10 (BWMHz/20 \text{ MHz}) \ dBm, \\ \min\left\{\begin{array}{l} T_{max}, \\ T_{max} - T_A + (P_H + 10 \cdot \log 10 (BWMHz/20 \text{ MHz}) - P_{TX}) \end{array}\right\} \end{array}\right\}$$

Each variable is defined as follows:

$T_A = 10$ dB $P_H = 23$ dBm;

$P_{TX}$ is the set to the value of $P_{CMAX\_H,c}$ as defined in 3GPP TS 36.101.

$T_{max}$ (dBm) = $10 \cdot \log 10(3.16228 \cdot 10^{-8}$ (mW/MHz)$\cdot$ BWMHz (MHz))

BWMHz is the single carrier bandwidth in MHz.

2.4. Subframe/Slot Structure Applicable to U-Band System

FIG. 19 is a diagram illustrating a partial transmission time interval (TTI) or a partial subframe/slot applicable to the present disclosure.

In the Rel-13 LAA system, a partial TTI is defined using the DwPTS to make the best use of a maximum channel occupancy time (MCOT) during transmission of a DL Tx burst and support continuous transmission. The partial TTI (or partial subframe) refers to an interval in which a signal is transmitted in a shorter period than the legacy TTI (e.g., 1 ms) in PDSCH transmission In the present disclosure, a starting partial TTI or a starting partial subframe refers to a format in which some symbols located at the fore part of a subframe are left blank, and an ending partial TTI or an ending partial subframe refers to a format in which some symbols located at the rear part of a subframe are left blank (whereas a complete TTI is referred to as a normal TTI or a full TTI).

FIG. 19 illustrates various types of partial TTIs. In FIG. 12, the first block represents an ending partial TTI (or an ending partial subframe/slot), the second block represents a starting partial TTI (or a starting partial subframe/slot), and the third block represents a partial TTI (or a partial subframe/slot) where some symbols located at the fore and rear parts of a subframe are left blank. Here, a time interval obtained by removing a portion for signal transmission from a normal TTI is referred to as a transmission gap (Tx gap).

While FIG. 19 is based on DL operation, the present disclosure may be equally applied to UL operation. For example, the partial TTI structure shown in FIG. 19 is applicable to PUCCH and/or PUSCH transmission.

3. Proposed Embodiments

Now, a detailed description will be given of configurations proposed by the present disclosure based on the above-described technical teachings.

As more and more communication devices require larger communication capacities, efficient use of a limited frequency band becomes a significant requirement. In this context, techniques of using an unlicensed band such as 2.4 GHz mainly used in the legacy WiFi system or 5 GHz and/or 60 GHz which has newly attracted attention are under consideration for a cellular communication system such as 3GPP LTE/NR.

To transmit a signal in an unlicensed band, a UE or a BS performs wireless transmission and reception based on contention between communication nodes. That is, when each communication node is to transmit a signal in the unlicensed band, the communication node is required to check that another communication node is not transmitting a signal in the unlicensed band by performing channel sensing before the signal transmission. For the convenience of description, this operation is defined as a listen before talk (LBT) operation or a CAP. Particularly, the operation of checking whether another communication node is transmitting a signal is referred to as carrier sensing (CS), and determining that any other communication node is not transmitting a signal is defined as confirming clear channel assessment (CCA).

Accordingly, an eNB/gNB or a UE may also have to perform an LBT operation or a CAP for signal transmission in an unlicensed band (hereinafter, referred to as U-band) in an LTE/NR system to which the present disclosure is applicable. In other words, the eNB/gNB or the UE may transmit a signal in the unlicensed band, using or based on the CAP.

Further, when the eNB/gNB or the UE transmits a signal in the unlicensed band, other communication nodes such as WiFi nodes should not interfere with the eNB/gNB or the UE by performing a CAP. For example, the WiFi standard (e.g., 801.11ac) specifies a CCA threshold as −62 dBm for a non-WiFi signal and as −82 dBm for a WiFi signal. Accordingly, a station (STA) or access point (AP) operating in conformance to the WiFi standard may not be allowed to transmit a signal to prevent interference, for example, when receiving a signal other than a WiFi signal at or above −62 dBm.

The NR system to which the present disclosure is applicable may support BWP switching in the following three methods.

(1) RRC signaling-based.
(2) DL/UL scheduling DCI(e.g., DCI format 0_0, DCI format 0_1, DCI format 1_0, or DCI format 1_1)-based.
(3) Timer-based.
When DL and/or UL scheduling DCI has not been discovered (or received/detected) in a specific BWP for a predetermined time or longer, the UE performs BWP switching to a (predefined) default BWP.

In the NR system to which the present disclosure is applicable, the UE may attempt to transmit a signal only in a BWP of a U-band, in which the UE has succeeded in a CAP (or which is determined to be available based on a CAP). In this regard, it may be preferred to switch an active BWP dynamically.

Therefore, a specific method of supporting dynamic BWP switching and a related specific UE operation according to the present disclosure will be described below in detail.

Further, the BS may dynamically configure the UE with a DL/UL configuration (or direction) on a slot basis by L1 signaling (e.g., physical-layer signaling, a PDCCH, or DCI) in the NR system to which the present disclosure is applicable.

More specifically, the BS may dynamically configure the UE with a DL/UL configuration (or direction) (i.e., a slot format indicator (SFI)) for each corresponding slot by DCI, and the DCI may be transmitted on a UE(-group) common PDCCH. The BS may indicate whether each of the symbols of the slot is a DL, UL, or flexible symbol by the signaling. For the convenience of description, a UE(-group) common PDCCH carrying an SFI is referred to as a GC-PDCCH.

Accordingly, a specific method for signaling on a GC-PDCCH (particularly, a UL direction signaling method) and a specific operation of a UE receiving the GC-PDCCH in the present disclosure will also be described in detail.

In the present disclosure, an initial signal refers to a signal transmitted for the purpose of indicating the start (and/or beam direction) of a DL transmission burst transmitted by a BS at the starting point of the DL transmission burst (or in every predetermined period) in a U-band or for the purpose of automatic gain control (AGC). The initial signal may be a legacy DL signal (e.g., PSS, SSS, CSI-RS, tracking reference signal (TRS), or DMRS) or a signal generated by partially modifying the DL signal. Alternatively, a specific DL channel (e.g., PBCH, PDCCH, or GC-PDCCH) may be used for the initial signal.

FIG. 20 is a simplified diagram illustrating operations of a UE and a BS in an unlicensed band applicable to the present disclosure.

Referring to FIG. 20, the BS may configure a BWP set on carrier(s) for the UE and partially activate the BWP set. A carrier may include a U-band or a U-carrier, and one or more BWPs may be configured on one carrier.

Subsequently, the BS or the UE may perform a CAP (or LBT) to perform a signal transmission process in the U-band. The CAP (or LBT) may be performed on a CAP (or LBT) subband basis. A CAP subband may refer to a minimum (frequency) unit/band (e.g., 20 MHz) for a CAP performed by the UE or the BS. CAP subbands may be configured independently on a carrier (group) basis and/or on a BWP (group) basis, or equally on all carriers (carrier groups) and/or all BWPs (BWP groups).

The BS or the UE may then perform a BWP-related operation based on the result of the CAP. For example, the BS may indicate to the UE the time/frequency configuration (or structure) (e.g., DL/UL direction) of a DL channel occupancy time (COT) obtained by transmitting a DL signal in some or all CAP subbands according to the CAP results of the respective LBT subbands.

Each of the above operations according to the present disclosure will be described below in detail.

3.1. Methods of Supporting Dynamic BWP Switching 3.1.1. First Dynamic BWP Switching Support Method: Method of Supporting Active BWP Switching by Initial Signal (or Specific UE-Specific DCI)

After initial access, the UE may be attached to a corresponding cell or may receive a service from the specific cell by RRC (or a MAC control element (CE)) signaling and be configured with multiple BWPs in a corresponding carrier. Herein, the UE may be configured. The UE may then perform an operation according to one of the following options.

[Option 1] The UE attempts to receive an initial signal (or specific UE-specific DCI) in all of the configured BWPs (i.e., in each configured BWP).

[Option 2] The UE attempts to receive the initial signal (or specific UE-specific DCI) in some of the configured BWPs by separate RRC (or MAC CE) signaling.

[Option 3] The UE attempts to receive the initial signal (or specific UE-specific DCI) in some of the configured BWPs according to a predefined rule (e.g., BWPs having a specific bandwidth (e.g., 20 MHz)).

When the UE discovers (or detects) the initial signal (or specific UE-specific DCI) in a specific BWP, the UE may determine an active BWP (and/or a BWP in which DL/UL scheduling DCI is to be monitored and/or a BWP for CSI/RRM measurement) in the following methods.

First method: the UE determines the BWP in which the initial signal (or specific UE-specific DCI) has been discovered as the active BWP (and/or the BWP in which DL/UL scheduling DCI is to be monitored and/or the BWP for CSI/RRM measurement).

Second method: the UE determines a BWP indicated by the initial signal (or specific UE-specific DCI) as the active BWP (and/or the BWP in which DL/UL scheduling DCI is to be monitored and/or the BWP for CSI/RRM measurement). Particularly, this method may be applied, when the BS has succeeded in a CAP for a wider frequency band than the BWP carrying the initial signal (or specific UE-specific DCI) and indicates information about BWPs corresponding to the wider frequency band by the initial signal (or specific UE-specific DCI).

Third method: when the UE discovers the initial signal (or specific UE-specific DCI) in multiple BWPs at the same time (or multiple active BWPs are indicated by the initial signal or the specific UE-specific DCI discovered simultaneously in the multiple BWPs), the UE may determine a BWP specified according to a predefined rule or by an RRC (or MAC CE) configuration (or indicated by L1 signaling) as the active BWP (and/or the BWP in which DL/UL scheduling DCI is to be monitored and/or the BWP for CSI/RRM measurement). For example, the UE may select a BWP having a widest (or narrowest) band and a highest (or lowest) BWP index as the active BWP.

One or more BWPs may be configured, in which reception of an initial signal (or specific UE-specific DCI) is attempted in the afore-described various options, and/or one or more BWPs may be determined in the afore-described various methods. Even in this case, a PDSCH that the UE receives at a specific time may be limited to one (active) BWP.

More specifically, it is assumed that the UE has been configured with BWP #0 ranging from 5150 MHz to 5170 MHz, BWP #1 ranging from 5170 MHz to 5190 MHz, and BWP #2 ranging from 5150 MHz to 5190 MHz. The UE may attempt to receive the initial signal in each of BWP #0, BWP #1, and BWP #2. When the UE receives the initial signal in BWP #0 and BWP #2, the UE may determine the larger BWP, BWP #2 as the active BWP and perform PDCCH monitoring and CSI/RRM measurement in BWP #2.

3.1.2. Second Dynamic BWP Switching Support Method: Events Triggering Timer Value Increase/Decrease and Method of Configuring Default BWP, in Timer-Based BWP Switching Support Operation Before the second dynamic BWP switching support method is described in detail, it is made sure that the term "timer" may be replaced with "counter" according to some embodiments.

In an example applicable to the present disclosure, a timer value may be set to a maximum value and decremented by 1 each time a specific event occurs. Therefore, when the timer reaches 0, BWP switching to a default BWP may be triggered.

In another example applicable to the present disclosure, the timer value may be set to 0 and incremented by 1 each time a specific event occurs. Therefore, when the timer reaches the maximum value, BWP switching to the default BWP may be triggered.

In the present disclosure, the timer-based BWP switching support operation includes both of the above methods. Accordingly, while the following description is given in the context of an operation of triggering BWP switching when the timer value is incremented by 1 each time and reaches the maximum value, for the convenience of description, the same may be applied, with some modification, to an operation of triggering BWP switching when the timer value is decremented by 1 each time and reaches 0.

Event Triggering Increase of Timer Value

Despite discovery of the initial signal, the UE may fail in discovering DL/UL scheduling DCI in the active BWP (or an active BWP to which the UE has switched based on the above-described first active BWP switching support method). In this case, the UE may increment/decrement the timer value by the number of slots in which the UE has failed in discovering the DL/UL scheduling DCI (or according to a function of the number of slots in which the UE has failed in discovering the DL/UL scheduling DCI).

In the case where the UE is capable of identifying the duration of a DL transmission burst from the initial signal and/or another channel, when the UE fails in discovering the DL/UL scheduling DCI during the duration, the UE may increment/decrement the timer value in a corresponding slot, whereas when the UE discovers the DL/UL scheduling DCI during the duration, the UE may reset the timer value.

Alternatively, in the case where the UE has difficulty in identifying the duration of a DL transmission burst from the initial signal and/or another channel, when the UE fails in discovering the DL/UL scheduling DCI during a specific preset duration, the UE may increment/decrement the timer value in a corresponding slot, whereas when the UE discovers the DL/UL scheduling DCI during the duration, the UE may reset the timer value.

In the above case, the UE may maintain the timer value in a slot determined to be outside the duration of the DL transmission burst.

Method of Configuring Default BWP

Considering that the BS may fail in a CAP for a specific single BWP, an operation of defining the specific single BWP as a default BWP may not be preferable. Therefore, a method of defining a plurality of different BWPs multiplexed in TDM at different time points as default BWPs is proposed in the present disclosure.

One or more default BWPs may be configured at a specific time. A TDM pattern of BWP(s) at different time points may be determined based on a function of a cell index and/or a slot index or configured by RRC (MAC CE or L1) signaling. For example, the default BWPs may be configured/determined to be BWP #0 and BWP #1 for slot #n and slot #n+1, BWP #1 and BWP #2 for slot #n+2 and slot #n+3, and BWP #0 and BWP #2 for slot #n+4 and slot #n+5.

3.2. GC-PDCCH

In the legacy LTE LAA system, a BS may indicate a UL duration to one or more UEs by a common PDCCH (scrambled with a cell common radio network identifier (CC-RNTI)). The UL duration should belong to a COT of the BS.

A UE scheduled to transmit a PUSCH only within the UL duration may transmit the PUSCH by performing a CAP (i.e., channel access type 2) that allows signal transmission when a corresponding U-band is idle only for 25 usc (regardless of a channel access type indicated by a UL grant). On the contrary, a UE, which has received information about the UL duration on the common PDCCH from the BS but has not been scheduled to transmit a PUSCH within the UL duration, may not expect to perform PDCCH monitoring (because the BS may schedule another UE to transmit a UL signal during the UL duration).

3.2.1. First GC-PDCCH-Based Signaling Method

The BS may indicate the DL/UL/flexible symbol region of each slot to one or more UEs by a GC-PDCCH. The BS may also indicate to the UEs whether a specific symbol is a UL (and/or flexible) symbol belonging to the COT of the BS or a UL (and/or flexible) symbol outside the COT of the BS.

In a specific example, if the BS provides SFI information about a specific slot period in 4 bits, the BS may signal to one or more UEs that UL (and/or flexible) symbol(s) indicated by four leading bits of 8-bit information twice as long as the SFI information belongs to the COT, and UL (and/or flexible) symbol(s) indicated by four trailing bits of the 8-bit information does not belong to the COT.

In another specific example, if the BS provides SFI information about a specific slot period in 4 bits, the BS may signal to one or more UEs that UL (and/or flexible) symbol(s) indicated by four leading bits of 8-bit information twice as long as the SFI information is not related to inclusion or non-inclusion in the COT, and UL (and/or flexible) symbol(s) indicated by four trailing bits of the 8-bit information belongs to (or does not belong to) the COT.

The UE may not expect to perform PDCCH monitoring and DL measurement during a symbol period configured with UL symbols irrespective of whether the symbol period belongs to the COT. Further, when the UE attempts a UL transmission during a UL (and/or flexible) symbol period belonging to the COT, the UE may perform a UL transmission based on a CAP of a channel access type allowed for sharing the COT with the BS (regardless of a channel access type indicated by a UL grant).

3.2.2. Second GC-PDCCH-Based Signaling Method

The BS may indicate the DL/UL/flexible symbol region of each slot to one or more UEs by a GC-PDCCH. The BS may differently indicate to the UEs whether a specific symbol is a UL (and/or flexible) symbol belonging to the COT of the BS or a UL (and/or flexible) symbol outside the COT of the BS, according to a BWP.

More specifically, the BS may actually transmit each DL transmission burst in a different BWP combination according to a CAP result. Therefore, it may be different whether a specific time period (e.g., a slot, a symbol, or the like) belongs to the COT of the BS, according to a BWP.

Accordingly, when a UE is capable of receiving information about a BWP in which the BS has succeeded in a CAP by an initial signal (or specific UE-specific DCI or a GC-PDCCH), the UE may differently interpret SFI information according to the BWP.

In a more specific example, it is assumed that the UE has been configured with BWP #0 ranging from 5150 MHz to 5170 MHz and BWP #1 ranging from 5170 MHz to 5190 MHz. It is also assumed that the UE is aware that the BS has succeeded in a CAP for BWP #0 only, by an initial signal (or specific UE-specific DCI or a GC-PDCCH).

In this case, when the UE receives signaling indicating that slot #n/n+1 is a UL slot and only slot #n belongs to the COT of the BS by a GC-PDCCH, the UE may operate as follows.

- The UE does not expect to perform PDCCH monitoring and CSI measurement in slot #n/n+1.
- When the UE transmits a UL signal in BWP #0, the UE is allowed to perform a CAP of a channel access type allowed for COT sharing, for a UL transmission in slot #n, whereas the UE is allowed only to perform a CAP of a channel access type indicated by a UL grant, for a UL transmission in slot #n+1.
- When the UE transmits a UL signal in BWP #1, the UE is allowed only to perform a CAP of a channel access type indicated by a UL grant, for a UL transmission in slot #n/n+1.

3.2.3. Third GC-PDCCH-Based Signaling Method

In the present disclosure, a minimum (frequency) unit for a CAP performed by the BS is assumed to be a CAP subband (e.g., 20 MHz). Although the BS has performed a CAP for a signal transmission in a larger BWP than a CAP subband of a U band, the BS may succeed only in a CAP for smaller CAP subband(s) than the BWP. In this case, the BS may indicate to one or more UEs that a DL transmission is performed only in the CAP subband(s) for which the CAP is successful or some UL belongs to a DL COT only in the CAP subband(s) for which the CAP is successful, in the following methods.

More specifically, each UE may be configured with a BWP corresponding to a separate frequency band and/or bandwidth. For example, UE 1 may be configured with a BWP having a bandwidth of 40 MHz, ranging from 5150 MHz to 5190 MHz, and UE 2 may be configured with a BWP having a bandwidth of 20 MHz, ranging from 5170 MHz to 5190 MHz. In this case, when a CAP subband is 20 MHz and the BS succeeds only in a CAP for a CAP subband corresponding to 5170 MHz to 5190 MHz, the BS may indicate to one or more UEs that a DL transmission is performed only in the 20 MHz, by a GC-PDCCH. To eliminate ambiguity between UEs that expect to receive BWPs of different frequency bands and/or bandwidths, the BS may signal to one or more UEs in the following methods.

In one method, for each of UEs expecting to receive BWPs of different frequency bands and/or different bandwidths, the position of a field to be received in the GC-PDCCH may be set for the UE. For example, field A of the GC-PDCCH may be configured for UEs expecting the same BWP as that of UE 1, and field B of the GC-PDCCH may be configured for UEs expecting the same BWP as that of UE 2. In this case, each field may include SFI information configured for the UEs corresponding to the field. In an applicable example, the field may include SFI information described in section 3.2.1. (i.e., SFI information indicating a UL (and/or flexible) symbol or a UL (and/or flexible) slot occupied by the BS and a UL (and/or flexible) symbol or a UL (and/or flexible) slot unoccupied by the BS, distinguishably from each other. Accordingly, each UE may identify a band in which a DL COT is configured, based on the information included in the field set in the received GC-PDCCH.

In another method, even UEs expecting to receive BWPs of different frequency bands and/or different bandwidths may refer to a common field in a GC-PDCCH, but interpret the common field according to a predetermined method. For example, when the field is configured in two bits, it may be pre-agreed (configured) between the BS and the UEs that the first bit corresponds to 5150 MHz to 5170 MHz and the second bit corresponds to 5170 MHz to 5190 MHz. UE 1 may obtain DL COT configuration information for the 40 MHz from the two bits, whereas UE 1 may obtain DL COT configuration information for the corresponding 20 MHz from the second bit only.

Alternatively, when only signal transmission in contiguous CAP subbands is always allowed, the signaling overhead of the foregoing methods may further be reduced. For example, when there are four CAP subbands in a 80-MHz BWP/CC, the BS may signal 4-bit bitmap information indicating transmission or non-transmission of the individual CAP subbands to one or more UEs or may signal contiguous CAP subband transmission information (i.e., as in an LTE UL resource allocation type 0 RIV scheme) to one or more UEs by bitmap information of ceiling$\{\log_2(n*(n+1)/2)\}$ bits where n is the number of LBT subbands in a BWP/CC or multiple BWPs/CCs (ceiling $\{X\}$ represents the smallest integer equal to or larger than X).

3.2.4. Fourth GC-PDCCH-Based Signaling Method

When transmitting a GC-PDCCH to one or more UEs, the BS may configure a BWP corresponding to a frequency band and/or a bandwidth separately for each UE. In a specific example, UE 1 may be configured with a BWP of a 40-MHz bandwidth ranging from 5150 MHz to 5190 MHz, and UE 2 may be configured with a BWP of a 20-MHz bandwidth ranging from 5170 MHz to 5190 MHz. If a CAP subband is 20 MHz and the BS has succeeded only in a CAP for the CAP subband corresponding to 5150 MHz to 5170 MHz, the BS may indicate to one or more UEs by the GC-PDCCH that a DL transmission will be performed only in the 20 MHz.

Besides, the BS may indicate to the one or more UEs by the GC-PDCCH that k slots counted from slot #n are DL slots.

In the above case, however, the GC-PDCCH is transmitted only in the BWP ranging from 5150 MHz to 5170 MHz. Therefore, UE 2 may fail in receiving the GC-PDCCH in its expected BWP (i.e., the BWP of a 20-MHz BW corresponding to 5170 MHz to 5190 MHz) and thus obtaining information about the DL slots. If UE 2 is pre-scheduled for a UL transmission in the period of the DL slots, UE 2 may perform the UL transmission during the time period based on a CAP.

In consideration of such a signal transmission, the BS needs to receive a signal in an adjacent carrier, simultaneously with a signal transmission. This operation may significantly increase the implementation complexity of the BS, and if the BS fails to receive the signal, the UL signal transmission may interfere with other co-located nodes.

To avert the problem, the BS may be configured to perform a DL transmission, only when the BS succeeds in a CAP in a common CAP subband for a plurality of UEs (e.g., UE 1 and UE 2), 5170 MHz to 5190 MHz. In other words, a reference subband available for GC-PDCCH transmission (one or more subbands included in the common CAP subband of the plurality of UEs) may be configured separately. In this regard, a UE may receive the GC-PDCCH only in the reference subband to obtain information about a band other than the reference subband, for which a DL COT is configured, or may (additionally) receive the GC-PDCCH in a subband other than the reference subband. The UE may assume that DL COT information obtained in different subbands is always identical.

3.2.5. Fifth GC-PDCCH-Based Signaling Method: Method of Transmitting and Receiving Signal/Channel Configured by Higher-Layer Signaling In the NR system to which the present disclosure is applicable, a UE which has not been configured with DCI format 2_0 indicating an SFI in a dynamic manner may operate as follows.

If the UE has not been configured with an SFI by RRC signaling, the UE may perform a DL signal/channel (e.g., a PDSCH or a CSI-RS) reception and a UL signal/channel (e.g., an SRS, PUCCH, PUSCH, or PRACH) transmission which have been configured by higher-layer signaling.

If the UE has been configured with an SFI by RRC signaling (e.g., TDD-UL-DL-ConfigurationCommon or TDD-UL-DL-ConfigDedicated), the UE may perform a DL signal/channel (e.g., a PDSCH or a CSI-RS) reception and a UL signal/channel (e.g., an SRS, PUCCH, PUSCH, or PRACH) transmission which have been configured by higher-layer signaling, in a slot/symbol region configured as flexible by the RRC signaling.

A UE configured with DCI format 2_0 may operate as follows.

The UE does not perform a DL signal/channel (e.g., a PDSCH or a CSI-RS) reception configured by higher-layer signaling in a slot/symbol region for which an SFI has not been configured by RRC signaling and which has not been indicated as DL by DCI format 2_0.

The UE does not perform a UL signal/channel (e.g., an SRS, PUCCH, PUSCH, or PRACH) transmission configured by higher-layer signaling in a slot/symbol region for which an SFI has not been configured by RRC signaling and which has not been indicated as UL by DCI format 2_0 (after a processing time capability for UL transmission preparation from the last symbol of a CORESET configured for reception of DCI format 2_0).

If the UE has been configured with an SFI by RRC signaling (e.g., TDD-UL-DL-ConfigurationCommon or TDD-UL-DL-ConfigDedicated), the UE does not perform a DL signal/channel (e.g., a PDSCH or a CSI-RS) reception configured by higher-layer signaling in a slot/symbol region which has not been indicated as DL by DCI format 2_0 in a slot/symbol region configured as flexible by the RRC signaling.

If the UE has been configured with an SFI by RRC signaling (e.g., TDD-UL-DL-ConfigurationCommon or TDD-UL-DL-ConfigDedicated), the UE does not perform a UL signal/channel (e.g., an SRS, PUCCH, PUSCH, or PRACH) transmission configured by higher-layer signaling in a slot/symbol region which has not been indicated as UL by DCI format 2_0 in a slot/symbol region configured as flexible by the RRC signaling (after a processing time capability for UL transmission preparation from the last symbol of a CORESET configured for reception of DCI format 2_0).

In operation in the unlicensed band, the BS may not indicate to a UE whether a specific slot/symbol region of a slot/symbol region configured as flexible by RRC signaling (or a region for which an SFI has not been configured by RRC signaling) is for DL or UL by DCI format 2_0 due to failure in a CAP. As a result, transmission/reception of a DL/UL signal/channel configured by higher-layer signaling in the slot/symbol region may be difficult.

Accordingly, the following operation methods for an unlicensed band are proposed in the present disclosure. More specifically, the following description is given of more specific DL and UL operations in an unlicensed band in the case of a DL signal/channel (e.g., a PDSCH or a CSI-RS) reception and/or a UL signal/channel (e.g., an SRS, PUCCH, PUSCH, or PRACH) transmission configured by higher-layer signaling.

(1) Option 1

When a UE is configured with DCI format 2_0, the UE may operate as follows, as if the DCI were not configured for the UE.

More specifically, even though a slot/symbol region configured as flexible by RRC signaling (e.g., TDD-UL-DL-ConfigurationCommon or TDD-UL-DL-ConfigDedicated) is not indicated as DL by DCI format 2_0, the UE may receive a DL signal/channel (e.g., a PDSCH or a CSI-RS) configured by higher-layer signaling in the slot/symbol region configured as flexible.

Alternatively, when the UE has not been configured with an SFI by RRC signaling, the UE may receive a DL signal/channel (e.g., a PDSCH or a CSI-RS) configured by higher-layer signaling in a slot/symbol region which has not been indicated as DL by DCI format 2_O.

Alternatively, even though a slot/symbol region configured as flexible by RRC signaling (e.g., TDD-UL-DL-ConfigurationCommon or TDD-UL-DL-configDedicated) is not indicated as UL by DCI format 2_0, the UE may transmit a UL signal/channel (e.g., an SRS, PUCCH, PUSCH, or PRACH) configured by higher-layer signaling in the slot/symbol region configured as flexible.

Alternatively, when the UE has not been configured with an SFI by RRC signaling, the UE may transmit a UL signal/channel (e.g., an SRS, PUCCH, PUSCH, or PRACH) configured by higher-layer signaling in a slot/symbol region which has not been indicated as UL by DCI format 2_0.

(2) Option 2

When a UE is configured with DCI format 2_0, the UE may operate as follows in a similar manner to an operation supported by the NR system.

More specifically, when the UE discovers a signal/channel (e.g., DCI format 2_0, an initial signal, or a DL burst) for detecting a DL transmission burst of a serving cell in a slot/symbol region configured as flexible by RRC signaling (e.g., TDD-UL-DL-ConfigurationCommon or TDD-UL-DE-ConfigDedicated) and thus identifies that a UL/DL configuration for a specific duration specifies a DL direction, the UE may receive a DL signal/channel (e.g., a PDSCH or a CSI-RS) configured by higher-layer signaling during the duration.

Alternatively, when the UE has not been configured with an SFI by RRC signaling, discovers a signal/channel (e.g., DCI format 2_0, an initial signal, or a DL burst) for detecting a DL transmission burst of a serving cell, and thus identifies that a UL/DL configuration for a specific duration specifies a DL direction, the UE may receive a DL signal/channel (e.g., a PDSCH or a CSI-RS) configured by higher-layer signaling during the duration.

Alternatively, when the UE discovers a signal/channel (e.g., DCI format 2_0, an initial signal, or a DL burst) for detecting a DL transmission burst of a serving cell in a slot/symbol region configured as flexible by RRC signaling (e.g., TDD-UL-DL-ConfigurationCommon or TDD-LT-DL-ConfigDedicated) and thus identifies that a UL/DL configuration for a specific duration specifies a UL direction, the UE may transmit a UL signal/channel (e.g., an SRS, PUCCH, PUSCH, or PRACH) configured by higher-layer signaling during the duration.

Alternatively, when the UE has not been configured with an SFI by RRC signaling, discovers a signal/channel (e.g., DCI format 2_0, an initial signal, or a DL burst) for detecting a DL transmission burst of a serving cell, and thus identifies that a UL/DL configuration for a specific duration specifies a UL direction, the UE may transmit a UL signal/channel (e.g., an SRS, PUCCH, PUSCH, or PRACH) configured by higher-layer signaling during the duration.

(3) Option 3

A different rule may be set for DL signal reception according to a monitoring periodicity configured for a UE, for reception of DCI format 2_0.

For example, when the monitoring periodicity is equal to or smaller than a specific value, the BS may have more frequent opportunities to transmit DCI. In this case, the UE may not receive a DL signal/channel configured by higher-layer signaling in a corresponding slot/symbol region (e.g., a slot/symbol region configured as flexible by RRC signaling (e.g., TDD-UL-DL-ConfigurationCommon or TDD-UL-DL-ConfigDedicated) or a slot/symbol region for which an SFI has not been configured by RRC signaling), On the contrary, when the monitoring periodicity is larger than the specific value, the UE may perform a DL signal reception operation according to the afore-described Option 1 (or Option 2).

Similarly, a different rule may be set for UL signal transmission according to a monitoring periodicity configured for a UE, for reception of DCI format 2_O.

For example, when the monitoring periodicity is equal to or smaller than a specific value, the BS may have more frequent opportunities to transmit DCI. In this case, the UE of the present disclosure may not receive a UL signal/channel configured by higher-layer signaling in a corresponding slot/symbol region (e.g., a slot/symbol region configured as flexible by RRC signaling (e.g., TDD-UL-DL-ConfigurationCommon or TDD-UL-DL-ConfigDedicated) or a slot/symbol region for which an SFI has not been configured by RRC signaling).

On the contrary, when the monitoring periodicity is larger than the specific value, the UE may perform a UL signal transmission operation according to the afore-described Option 1 (or Option 2).

Regarding the above-described options, the same or different options may be applied to DL and UL. For example, Option 2 for DL and Option 1 for UL may be applied. Alternatively, Option 1 may be applied for UL, with no DL signal/channel reception configured by higher-layer signaling in a slot/symbol region configured as flexible as in a legacy NR system.

Additionally, when separate DCI indicating time/frequency axis information about a COT of the BS is introduced to the NR system to which the present disclosure is applicable, the same operation may be performed by applying the DCI instead of DCI format 2_0 of the foregoing proposed methods.

3.2.6. Sixth GC-PDCCH-Based Signaling Method: Signaling Method Based on a Combination of the Foregoing Proposed Signaling Methods As described above, a frequency subband (e.g., a CAP BW, a CAP unit, 20 MHz, or the like) in which the BS may substantially transmit a DL signal in one frequency band (e.g., a BWP) may be determined (based on a CAP of the BS). The BS according to the present disclosure may provide one or UEs with SFI information and occupancy information for each frequency subband to one or more UEs by the following GC-PDCCH. For the convenience of description, one frequency band is treated simply as a BWP, and one frequency subband is treated simply as a CAP BW. However, the technical configuration described below may be extended to various examples according to embodiments (e.g., one frequency band=a frequency band of a predetermined size, which is larger than one BWP, and one frequency subband=a frequency band corresponding to one BWP).

The following description is based on the assumption that one BWP includes a plurality of CAP BWs. It is also assumed that the BS performs/attempts a DL signal transmission based on an independent CAP for each CAP BW. The independent CAP means that it is determined independently for each CAP BW whether the CAP BW is occupied by the BS, not meaning that the types of CAPs performed for all CAP BWs are different.

The BS may provide the following information commonly to one or more UEs through a GC-PDCCH.

Information about a CAP BW occupied by the BS within one BWP

Information about UL (and/or flexible) symbols/slots occupied by the BS in the CAP BW occupied by the BS and information about UL (and/or flexible) symbols/slots not occupied by the BS in the CAP BW occupied by the BS. The UL (and/or flexible) symbol/slot information may be included in SFI information or may be configured separately from the SFI information.

The BS may provide the information to the one or more UEs in (i) fields that are distinguished from each other according to UE groups for which different CAP BWs are configured, or (ii) fields that are distinguished from each other according to CAP BWs.

In the following description, it is assumed that CAP BW #0 and CAP BW #1 are configured for UE 1, and CAP BW #1 is configured for UE 2.

According to an example, the BS may distinguish a field for UE 1 (hereinafter, field #A) from a field for UE 2 (hereinafter, field #B), and accordingly provide UE 1 and UE 2 with (a) information about a CAP BW occupied by the BS and (b) information about UL (and/or flexible) symbols/slots occupied by the BS in the CAP BW occupied by the BS and information about UL (and/or flexible) symbols/slots not occupied by the BS in the CAP BW occupied by the BS.

More specifically, when the BS occupies both CAP BW #0 and CAP BW #1 for DL signal transmission, the BS may provide UE 1, in field #A, with (a) information indicating that the BS occupies both of CAP BW #0 and CAP BW #1 and (b) information about UL (and/or flexible) symbols/slots occupied by the BS in each of the CAP BWs occupied by the BS and information about UL (and/or flexible) symbols/slots not occupied by the BS in the CAP BW occupied by the BS. The information about UL (and/or flexible) symbols/slots occupied by the BS and the information about UL (and/or flexible) symbols/slots not occupied by the BS may be configured separately or commonly for CAP BW #0 and CAP BW #1 occupied by the BS.

Likewise, the BS may provide UE 2, in field #B, with (a) information indicating that the BS occupies CAP BW #1 and (b) information about UL (and/or flexible) symbols/slots occupied by the BS in CAP BW #1 and information about UL (and/or flexible) symbols/slots not occupied by the BS in CAP BW #1.

Alternatively, when the BS occupies only CAP BW #1 for DL signal transmission (i.e., the BS does not occupy CAP BW #0), the BS may provide UE1, in field #A, with (a) information that the BS does not occupy both CAP BW #0 and CAP BW #1. Field #A may or may not include (b) information about UL (and/or flexible) symbols/slots not occupied by the BS in CAP BW #0 and CAP BW #1. When the information (b) is not included in field #A, UE1 may obtain slot format information including the information (b) in a field other than field #A.

Additionally, the BS may provide UE2, in field #B, with (a) information indicating that the BS occupies CAP BW #1 and (b) information about UL (and/or flexible) symbols occupied by the BS and information about UL (and/or flexible) symbols not occupied by the BS in CAP BW #1.

In another example, the BS may provide related information to the one or more UEs in fields which are distinguished from each other according to CAP BWs.

More specifically, when the BS occupies both CAP BW #0 and CAP BW #1 for DL signal transmission, the BS may provide UE 1, in a field for CAP BW #0 (referred to field #C), with (a) information indicating that the BS occupies CAP BW #0 and (b) information about UL (and/or flexible) symbols/slots occupied by the BS and information about UL (and/or flexible) symbols/slots not occupied by the BS in CAP BW #0. Similarly, the BS may provide UE 1 and UE 2, in a field for CAP BW #1 (referred to field #D), with (a) information indicating that the BS occupies CAP BW #1 and (b) information about UL (and/or flexible) symbols/slots occupied by the BS and information about UL (and/or flexible) symbols/slots not occupied by the BS in CAP BW #1.

Alternatively, when the BS occupies only CAP BW #1 for DL signal transmission, the BS may provide UE 1, in field #C, with (a) information indicating that the BS does not occupy CAP BW #0. Field #C may or may not include (b) information about UL (and/or flexible) symbols/slots not occupied by the BS in CAP BW #0. When the information (b) is not included in field #C, UE1 may obtain slot format information including the information (b) in a field other than field #C.

Additionally, the BS may provide UE 1 and UE 2, in field #D, with (a) information indicating that the BS occupies CAP BW #1 and (b) information about UL (and/or flexible) symbols occupied by the BS and information about UL (and/or flexible) symbols not occupied by the BS in CAP BW #1.

In the above-described configurations, the information (b) may be configured according to section 3.2.1. (i.e., information about UL (and/or flexible) symbols occupied by the BS and information about UL (and/or flexible) symbols not occupied by the BS are configured separately) or may be configured by jointly encoding the two pieces of information.

Particularly, when different slot formats (or different UL and/or flexible symbol/slot configurations) are configured for different CAP BWs in the above configurations, the BS may provide one or more UEs with the slot formats of the respective CAP BWs (or information about UL (and/or flexible) symbols/slots occupied by the BS and information about UL (and/or flexible) symbols/slots not occupied by the BS), independently on a CAP BW basis (or by joint encoding).

Based on the information, the one or more UEs may obtain information about a CAP BW occupied by the BS, and may also obtain, on a CAP BW basis, information about UL symbols/slots occupied by the BS (or UL symbols/slots in which a CAP for COT sharing with the BS is allowed) and UL symbols/slots not occupied by the BS (or UL symbols/slots in which a CAP for COT sharing with the BS is not allowed). Based on the information, each of the one or more UEs may not expect configuration of a DL signal reception, a UL signal transmission, or PDCCH monitoring for a certain time period in a CAP BW configured for the UE.

3.2.7. Seventh GC-PDCCH-Based Signaling Method

The BS according to the present disclosure may transmit DL COT duration information and slot format information for each CAP BW occupied by the BS to one or more UEs on a GC-PDCCH.

For this purpose, the BS may transmit the information to the one or more UEs in (i) fields that are distinguished from each other according to UE groups for which different CAP BWs are configured, or (ii) fields that are distinguished from each other according to CAP BWs.

As described above, the BS may transmit DL COT duration information and slot format information (or UL (and/or flexible) symbol/slot information) for one or more CAP BWs on a UE group basis in (i) the fields that are distinguished from each other according to UE groups for which different CAP BWs are configured.

Alternatively, the BS may transmit DL COT duration information and slot format information (or UL (and/or flexible) symbol/slot information) on a CAP BW basis in (ii) the fields that are distinguished from each other according to CAP BWs.

In the above-described configurations, if slot format information (or UL (and/or flexible) symbol/slot information) for a specific UE group or CAP BW is identical to slot format information (or UL (and/or flexible) symbol/slot information) for another UE group or CAP BW, the slot format information (or UL (and/or flexible) symbol/slot information) for the specific UE group or CAP BW may be omitted.

The one or more UEs may obtain information about UL (and/or flexible) symbols/slots included in the DL COT of the BS and information about UL (and/or flexible) symbols/slots not included in the DL COT of the BS, for each CAP BW by receiving the GC-PDCCH configured in the above manner. Based on the information, each of the one or more UEs may not expect configuration of a DL signal reception, a UL signal transmission, or PDCCH monitoring for a certain time period in a CAP BW configured for the UE.

3.3. SCS Configuration

In sharing a COT of the BS with a UL transmission of a UE, it may be preferable to set an SCS for DL transmission equal to an SCS for UL transmission.

Specifically, when an SCS is changed, a switching time may be taken for the SCS switching (due to radio frequency (RF) tuning and/or configuration information update and/or software update). In this case, to reduce the transmission delay of an HARQ-ACK feedback (within a DL COT) for a PDSCH included in the DL COT, a smaller switching gap is more preferable.

To this end, different SCSs may be set for UL transmission within the DL COT and for UL transmission outside the DL COT. For example, when the SCS for DL transmission is set to 15 kHz and the SCS for UL transmission is set to 15 kHz or 30 kHz, the UE may assume that the SCS for UL transmission scheduled (or performed) in the DL COT is 15 kHz.

Specifically, the UE may acquire information about time resources of the DL COT (occupied by the BS) from UE-specific DCI or group-common DCI. Subsequently, when UL transmission is scheduled/configured in the time resources, the UE may assume that the SCS for the UL transmission is 15 kHz.

Alternatively, when the CAP of a channel access type allowed for sharing the COT with the BS is indicated by a UL grant, the UE may assume that the SCS for corresponding UL transmission is 15 kHz.

Alternatively, when one or more of a PUCCH resource or an HARQ feedback timing or an HARQ-ACK codebook type allowed for sharing the COT with the BS is indicated by a UL grant (DL scheduling DCI or common DCI), the UE may assume that the SCS for the corresponding UL transmission is 15 kHz.

FIG. 21 is a simplified diagram illustrating a signal flow for signal transmission and reception operations of a UE and a BS according to an example of the present disclosure, FIG. 22 is a simplified flowchart illustrating a UE operation according to the present disclosure, and FIG. 23 is a simplified flowchart illustrating a BS operation according to the present disclosure.

A UE according to the present disclosure obtains configuration information related to one or more first CAP subbands included in an unlicensed band. For example, the UE may obtain the configuration information related to the one or more first CAP subbands based on a pre-agreement/preset rule between the UE and a BS. Alternatively, in another example, the UE may obtain the configuration information related to the one or more first CAP subbands based on physical-layer signaling (e.g., a PDCCH or DCI) and/or higher-layer signaling (e.g., RRC signaling or a MAC CE) (S2110 and S2210). Thus, the BS may transmit the configuration information related to the one or more first CAP subbands included in the unlicensed band to one or more UEs including the UE (S2120 and S2310).

Additionally, the UE may obtain configuration information related to a BWP including the one or more first CAP subbands. In a specific example, the UE may obtain the configuration information related to the BWP in one or more of the following methods.

The configuration information related to the BWP is obtained based on a CORESET for a specific type of PDCCH CSS set.

Configuration information related to an initial BWP is obtained by the higher-layer signaling.

Configuration information related to one BWP determined by physical-layer signaling among a plurality of BWPs configured by the higher-layer signaling.

The UE receives DCI including slot format information about one or more slots from the BS (S2120 and S2220). The DCI may be received on a GC-PDCCH, and include a first field including information indicating, for each CAP subband, whether the BS occupies the CAP subband. Thus, the BS may transmit the DCI including the slot format information about the one or more slots to the one or more UEs (S2120 and S2320).

The UE obtains information about one or more second CAP subbands occupied by the BS among the one or more first CAP subbands configured for the UE, based on information related to the one or more first CAP subbands configured for the UE in information included in the first field of the DCI (S2130 and S2230).

The information included in the first field, which indicates for each CAP band whether the CAP subband is occupied by the BS may correspond to information indicating, for each frequency band of a predetermined is in the frequency domain, whether the frequency band is occupied by the BS.

More specifically, the information indicating, for each CAP subband, whether the CAP subband is occupied by the BS corresponds to a plurality of pieces of bit information, and the plurality of pieces of bit information may be configured based on an order related to corresponding frequency bands in the frequency domain.

The frequency band of the predetermined size may be a 20-MHz frequency band.

The UE transmits and receives signals to and from the BS in the unlicensed band based on the information about the one or more second subbands occupied by the BS among the one or more first CAP subbands configured for the UE (S2140 and S2240). Accordingly, the BS may transmit and receive signals to and from the one or more UEs in the unlicensed band based on the information included in the first field, which indicates, for each CAP subband, whether the CAP subband is occupied by the BS (S2140 and S2230).

In the present disclosure, the transmission and reception of signals to and from the BS in the unlicensed band by the UE may include one or more of the following operations.

The UE receives a DL signal from the BS in the one or more second CAP subbands of the unlicensed band based on the information about the one or more second CAP subbands occupied by the BS among the one or more first CAP subbands configured for the UE.

The UE transmits a UL signal to the BS, using a first CAP during a time period occupied by the BS in the one or more second CAP subbands based on the information about the one or more second CAP subbands occupied by the BS among the one or more first CAP subbands configured for the UE.

The UE transmits a UL signal to the BS, using a second CAP during a time period not occupied by the BS in the one or more second CAP subbands or in a frequency band other than the one or more frequency bands based on the information about the one or more second CAP subbands occupied by the BS among the one or more first CAP subbands configured for the UE.

The first CAP may be a CAP for signal transmission based on whether a channel is idle for a predetermined time, and the second CAP may be a CAP related to DCI scheduling the UL signal (or a CAP indicated/configured by the DCI).

In the above-described example, the slot format information about the one or more slots, included in the DCI may indicate that 14 symbols included in each slot is related to one of a symbol for DL, a symbol for UL, and a flexibly used symbol.

Further, the DCI may be configured to be transmitted commonly to a plurality of UEs including the UE.

Further, the DCI may further include information indicating UL resources occupied by the BS and UL resources not occupied by the BS in the one or more second CAP subbands occupied by the BS, distinguishably from each other.

In an applicable example, the information indicating UL resources occupied by the BS and UL resources not occupied by the BS in the one or more second CAP subbands occupied by the BS may have one of the following configurations.

The information includes, as separate bit information, first information indicating the UL resources occupied by the BS and second information indicating the UL resources not occupied by the BS in the one or more second CAP subbands occupied by the BS.

The information includes bit information obtained by jointly encoding the information indicating the UL resources occupied by the BS and the information indicating the UL resources not occupied by the BS in the one or more second CAP subbands occupied by the BS.

In the present disclosure, the DCI may further include information about the duration of a time period during which the BS occupies the one or more second CAP subbands.

The information about the duration of the time period during which the BS occupies the one or more second CAP subbands may include information about the duration of a time period during which the BS occupies each individual second CAP subband.

In the present disclosure, the DCI (or GC-PDCCH) may be transmitted and received in a licensed band or the unlicensed band.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a predefined signal (or a physical-layer or higher-layer signal) by a BS.

4. Device Configuration

FIG. 24 is a block diagram illustrating the configurations of a UE and a BS for implementing the proposed embodiments. The UE and the BS illustrated in FIG. 24 operate to implement the embodiments of the afore-described method of transmitting and receiving a signal in an unlicensed band.

A UE 1 may act as a transmission end on a UL and as a reception end on a DL. A BS (eNB or gNB) 100 may act as a reception end on a UL and as a transmission end on a DL.

That is, each of the UE and the BS may include a transmitter (Tx) 10 or 110 and a receiver (Rx) 20 or 120, for controlling transmission and reception of information, data, and/or messages, and an antenna 30 or 130 for transmitting and receiving information, data, and/or messages.

Further, each of the UE and the BS includes a processor 40 or 140 for implementing the afore-described embodiments of the present disclosure. The processor 40 or 140 may be configured to perform the foregoing described/proposed procedures and/or methods by controlling the memory 50 or 150 and/or the Tx 10 or 110 and/or the Rx 20 or 120.

For example, the processor 40 or 140 includes a communication modem designed to implement wireless communication technologies (e.g., LTE and NR). The memory 50 or 150 is coupled to the processor 40 or 140, and stores various types of information related to operations of the processor 40 or 140. For example, the memory 50 or 150 may store software code including instructions for performing all or part of processes controlled by the processor 40 or 140 or the afore-described/proposed procedures and/or methods. The Tx 10 or 110 and/or the Rx 20 or 120 is coupled to the processor 40 or 140 and transmits and/or receives a wireless signal. The processor 40 or 140 and the memory 50 or 150 may be part of a processing chip (e.g., system on chip (SoC)).

The Tx and Rx of the UE and the BS may perform a packet modulation/demodulation function for data transmission, a high-speed packet channel coding function, OFDM packet scheduling, TDD packet scheduling, and/or channelization. Each of the UE and the BS of FIG. 47 may further include a low-power radio frequency (RF)/intermediate frequency (IF) module.

FIG. 25 is a block diagram illustrating a communication device that implements the proposed embodiments.

The communication device illustrated in FIG. 25 may be a UE and/or a BS (e.g., eNB or gNB) adapted to perform the above mechanism or any device performing the same operation.

As illustrated in FIG. 25, the communication device may include a digital signal processor (DSP)/microprocessor 210 and a radio frequency (RF) module (transceiver) 235. The DSP/microprocessor 210 is electrically coupled to the transceiver 235 and controls the transceiver 235. The communication device may further include a power management module 205, a battery 255, a display 215, a keypad 220, a subscriber identity module (SIM) card 225, a memory device 230, a speaker 245, and an input device 250, according to a designer's choice.

Particularly, the communication device illustrated in FIG. 25 may be a UE including a receiver 235 configured to receive a request message from a network, a transmitter 235 configured to transmit transmission/reception timing information to the network. The receiver and the transmitter may collectively form the transceiver 235. The UE may further include a processor 210 coupled to the transceiver (the receiver and the transmitter) 235.

Further, the communication device illustrated in FIG. 25 may be a network device including a transmitter 235 configured to transmit a request message to a UE and a receiver 235 configured to receive transmission/reception timing information from the UE. The receiver and the transmitter may collectively form the transceiver 235. The network may further include a processor 210 coupled to the transceiver (the receiver and the transmitter) 235. The processor 210 may calculate a latency based on the transmission/reception timing information.

Processors of a UE (or a communication included in the UE) and a BS (or a communication device included in the BS) according to the present disclosure may operate as follows by controlling memories.

In the present disclosure, a UE or a BS may include at least one RF module, at least one processor, and at least one memory operatively coupled to the at least one processor and storing instructions which when executed, cause the at least one processor to perform the following operation. A communication device included in the UE or the BS may be configured to include the at least one processor and the at least one memory. The communication device may be configured to be coupled to the at least one RF module, with or without the at least one RF module.

The processor included in the UE (or the processor of the communication device included in the UE) may be configured to obtain configuration information related to one or more first CAP subbands included in the unlicensed band and receive DCI including slot formation information about one or more slots from a BS. The DCI may include a first field including information indicating, for each CAP subband, whether the CAP subband is occupied by the BS. The processor may be configured to obtain information about one or more second CAP subbands occupied by the BS among the one or more first CAP subbands configured for the UE, based on information related to the one or more first CAP subbands configured for the UE in the information included in the first field of the DCI, and transmit and receive signals to and from the BS in the unlicensed band, based on the information about the one or more second CAP subbands occupied by the BS among the one or more first CAP subbands configured for the UE.

In response to the UE operation, the processor included in the BS (or the processor of the communication device included in the BS) may be configured to transmit, to each of one or more UEs, configuration information related to one or more first CAP subbands included in the unlicensed band, and transmit DCI including slot format information about one or more slots to the one or more UEs. The DCI may include a first field including information indicating, for each CAP subband, whether the CAP subband is occupied by the BS. The processor may be configured to transmit and receive signals to and from the one or more UEs in the unlicensed band, based on the information indicating, for each CAP subband, whether the CAP subband is occupied by the BS.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a multi-mode multi-band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method by a user equipment (UE) operating in a wireless communication system, the method comprising:
   receiving a time division duplex (TDD) uplink downlink configuration via a radio resource control (RRC) signaling;
   receiving, by a higher layer, information related to transmission of an uplink signal in a resource region;
   receiving a signal including information about allowance to transmit the uplink signal for the UE not detecting of downlink control information (DCI) for providing a slot format; and
   (i) based on a resource region being configured as flexible by the TDD uplink downlink configuration, and (ii) based on the information related to the transmission of the uplink signal being configured by the higher layer, and (iii) based on the information about allowance to transmit the uplink signal for the UE not detecting of the DCI for providing the slot format, transmitting the uplink signal in the resource region without detecting of the DCI, wherein the uplink signal is one of a sounding reference signal (SRS), a physical uplink control channel (PUCCH), a physical uplink shared channel (PUSCH), and a physical random access channel (PRACH).

2. The method of claim 1, wherein the higher layer includes a medium access control MAC) layer and a RRC layer.

3. The method of claim 1, wherein the uplink signal is transmitted through an unlicensed band.

4. The method of claim 1, wherein the uplink signal is transmitted based on a monitoring period for receiving the DCI being larger than a threshold value.

5. The method of claim 1, wherein a physical downlink shared channel (PDSCH) and a channel state information-reference signal (CSI-RS) are not received in a resource region configured as flexible.

6. The method of claim 1, wherein the DCI includes information about channel occupancy time for a frequency band.

7. A user equipment (UE) operating in a wireless communication system, the UE comprising:
- at least one radio frequency (RF) module;
- at least one processor; and
- at least one memory operably connectable to the at least one processor and storing instructions that, when executed by the at least one processor, perform operations comprising:
  - receiving a time division duplex (TDD) uplink downlink configuration via a radio resource control (RRC) signaling;
  - receiving, by a higher layer, information related to transmission of an uplink signal in a resource region,
  - receiving a signal including information about allowance to transmit the uplink signal for the UE not detecting of downlink control information (DCI) for providing a slot format; and
  - (i) based on a resource region being configured as flexible by the TDD uplink downlink configuration, and (ii) based on the information related to the transmission of the uplink signal in the resource region being configured by the higher layer, and (iii) based on the information about allowance to transmit the uplink signal for the UE not detecting of the DCI for providing the slot format, transmitting the uplink signal in the resource region without detecting of the DCI,
  - wherein the uplink signal is one of a sounding reference signal (SRS), a physical uplink control channel (PUCCH), a physical uplink shared channel (PUSCH), and a physical random access channel (PRACH).

8. The UE of claim 7, wherein the higher layer includes a medium access control MAC) layer and a RRC layer.

9. The UE of claim 7, wherein the first uplink signal and the second uplink signal are transmitted through an unlicensed band.

10. The UE of claim 7, wherein the first uplink signal and the second uplink signal are transmitted based on a monitoring period for receiving the DCI being larger than a threshold value.

11. The UE of claim 7, wherein a physical downlink shared channel (PDSCH) and a channel state information-reference signal (CSI-RS) are not received in a resource region configured as flexible.

12. The UE of claim 7, wherein the DCI includes information about channel occupancy time for a frequency band.

13. A non-transitory computer-readable storage medium storing instructions that, based on being executed by a processor, perform operations comprising:
- receiving a time division duplex (TDD) uplink downlink configuration via a radio resource control (RRC) signaling;
- receiving, by a higher layer, information related to transmission of an uplink signal in a resource region;
- receiving a signal including information about allowance to transmit the uplink signal for the UE not detecting of downlink control information (DCI) for providing a slot format; and
- (i) based on the resource region being configured as flexible by the TDD uplink downlink configuration, and (ii) based on the information related to the transmission of the uplink signal in the resource region being configured by the higher layer, and (iii) based on the information about allowance to transmit the uplink signal for the UE not detecting of the DCI for providing the slot format, transmitting the uplink signal in the resource region without detecting of the DCI,
- wherein the uplink signal is one of a sounding reference signal (SRS), a physical uplink control channel (PUCCH), a physical uplink shared channel (PUSCH), and a physical random access channel (PRACH).

* * * * *